(12) United States Patent
Tsai et al.

(10) Patent No.: US 8,508,861 B2
(45) Date of Patent: Aug. 13, 2013

(54) IMAGE LENS ASSEMBLY

(75) Inventors: Tsung-Han Tsai, Taichung (TW);
Ming-Ta Chou, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 48 days.

(21) Appl. No.: 13/415,401

(22) Filed: Mar. 8, 2012

(65) Prior Publication Data
US 2013/0107376 A1    May 2, 2013

(30) Foreign Application Priority Data

Oct. 27, 2011    (TW) .............................. 100139055 A

(51) Int. Cl.
*G02B 13/18*    (2006.01)
*G02B 9/60*    (2006.01)

(52) U.S. Cl.
USPC .......................................... 359/714; 359/770

(58) Field of Classification Search
USPC ................................................. 359/714, 770
See application file for complete search history.

(56) References Cited

U.S. PATENT DOCUMENTS

| | | | |
|---|---|---|---|
| 6,285,516 B1 * | 9/2001 | Ori ................................ | 359/770 |
| 7,446,955 B1 | 11/2008 | Noda | |
| 2011/0176049 A1 * | 7/2011 | Hsieh et al. ................... | 348/340 |

* cited by examiner

*Primary Examiner* — Scott J Sugarman
(74) *Attorney, Agent, or Firm* — Morris Manning & Martin LLP; Tim Tingkang Xia, Esq.

(57) ABSTRACT

This present disclosure provides an image lens assembly in order from an object side to an image side comprising five lens elements with refractive power: a first lens element with negative refractive power having a concave image-side surface; a second lens element with positive refractive power having a convex image-side surface; a third lens element with positive refractive power having a concave object-side surface and a convex image-side surface; a fourth lens element with negative refractive power; and a fifth lens element with positive refractive power. By such arrangement, sufficient field of view is provided, and the aberration of the lens assembly is corrected for obtaining higher image resolution.

25 Claims, 16 Drawing Sheets

US 8,508,861 B2

IMAGE LENS ASSEMBLY

CROSS-REFERENCE TO RELATED APPLICATIONS

This non-provisional application claims priority under 35 U.S.C. §119(a) on Patent Application No. 100139055 filed in Taiwan, R.O.C. on Oct. 27, 2011, the entire contents of which are hereby incorporated by reference.

BACKGROUND

1. Technical Field

The present disclosure relates to an image lens assembly, and more particularly, to a compact image lens assembly used in electronic products.

2. Description of the Prior Art

In recent years, imaging lenses have been applied to a wide variety of apparatuses such as webcams, automotive lens assemblies, security surveillance cameras and electronic game devices. Generally, the sensor of a general photographing camera is none other than CCD (Charge Coupled Device) or CMOS device (Complementary Metal Oxide Semiconductor device). Furthermore, advances in semiconductor manufacturing technology have allowed the pixel size of sensors to be reduced and therefore lead imaging lens assemblies to high resolution and to be even more compact. In the mean time, the demand for better image quality is increased.

In the consideration of the image character of capturing wide area at once, a conventional imaging lens assembly applied for webcams, automotive lens assemblies, security surveillance cameras and electronic game devices is required to have a wide field of view. Generally, a traditional imaging lens assembly with a wide field of view, such as the four-element lens assembly disclosed in U.S. Pat. No. 7,446,955, is arranged in such manner that the front lens group has negative refractive power and the rear lens group has positive refractive power, thereby forming an inverse telephoto structure to achieve a wide field of view. While such arrangement facilitates the enlargement of the field of view, the aberration correction of the optical system is ineffective due to the inclusion of only one lens element in the rear lens group. Moreover, vehicles equipped with rear-view cameras have become more and more common, and there is a trend toward high-resolution lens assembly with wide field of view for rear-view cameras. Therefore, a need continuously exists in the art for a high-resolution lens assembly with wide field of view and a moderate total track length.

SUMMARY

The present disclosure provides an image lens assembly comprising five lens elements with refractive power, in order from an object side to an image side: a first lens element with negative refractive power having a concave image-side surface; a second lens element with positive refractive power having a convex image-side surface; a third lens element with positive refractive power having a concave object-side surface and a convex image-side surface; a fourth lens element with negative refractive power; and a fifth lens element with positive refractive power; wherein a radius of the curvature of the image-side surface of the third lens element is R6, a radius of the curvature of the object-side surface of the fourth lens element is R7, an axial distance between the second lens element and the third lens element is T23, a central thickness of the second lens element is CT2, a focal length of the image lens assembly is f, a focal length of the first lens element is f1, a focal length of the second lens element is f2, and they satisfy the following relations: $|R6/R7|<0.85$; $0<T23/CT2<1.0$; and $0.7<|f/f1|+f/f2<2.4$.

On the other hand, the present disclosure provides an image lens assembly comprising, in order from an object side to an image side: a front lens group having positive refractive power comprising two lens elements with refractive power, in order from the object side to the image side: a first lens element with negative refractive power having a concave image-side surface; and a second lens element with positive refractive power having a convex image-side surface; a stop; a rear lens group having positive refractive power comprising, in order from the object side to the image side: a third lens element with positive refractive power having a concave object-side surface and a convex image-side surface; a fourth lens element with negative refractive power; and a fifth lens element with positive refractive power, wherein a radius of the curvature of the image-side surface of the third lens element is R6, a radius of the curvature of the object-side surface of the fourth lens element is R7, an axial distance between the second lens element and the third lens element is T23, a central thickness of the second lens element is CT2, a focal length of the image lens assembly is f, a focal length of the first lens element is f1, a focal length of the second lens element is f2, and they satisfy the following relations: $|R6/R7|<0.85$; $0<T23/CT2<1.0$; and $0.7<|f/f1|+f/f2<2.4$.

Furthermore, the present disclosure provides an image lens assembly comprising five lens elements with refractive power, in order from an object side to an image side: a first lens element with negative refractive power having a concave image-side surface; a second lens element with positive refractive power having a concave object-side surface and a convex image-side surface; a third lens element with positive refractive power having a convex image-side surface; a fourth lens element with negative refractive power, at least one of the object-side and the image-side surfaces thereof being aspheric, and the fourth lens element is made of plastic; and a fifth lens element with positive refractive power, at least one of the object-side and the image-side surfaces thereof being aspheric, and the fifth lens element is made of plastic; wherein a radius of the curvature of the image-side surface of the third lens element is R6, a radius of the curvature of the object-side surface of the third lens element is R5, a radius of the curvature of the object-side surface of the fourth lens element is R7, an axial distance between the second lens element and the third lens element is T23, a central thickness of the second lens element is CT2, a focal length of the image lens assembly is f, a focal length of the first lens element is f1, a focal length of the second lens element is f2, and they satisfy the following relations: $|R6/R5|<0.6$; $|R6/R7|<0.85$; $0<T23/CT2<1.0$; and $0.7<|f/f1|+f/f2<2.4$.

By such arrangement, a moderate total track length of the imaging lens system can be maintained, sufficient field of view is provided, and the aberration of the lens assembly is corrected for obtaining higher image resolution.

In the aforementioned image lens assembly, the first lens element has negative refractive power, which is favorable for enlarging the field of view of the lens assembly. When the second lens element has positive refractive power, and since the first lens element has negative refractive power and provides the wide field of view, the second lens element combines with the first lens element allows aberrations produced by the enlarged field of view to be corrected. When the third lens element has positive refractive power, the third lens element provides the main refractive power of the lens assembly, and thereby the total track length thereof is reduced. When the fourth lens element has negative refractive power, the chromatic aberration of the lens assembly can be effectively corrected. When the fifth lens element has positive refractive power, it can effectively distribute the refractive power of the third lens element and suppress the incident angle on an image sensor so as to improve the photo-sensitivity of the assembly.

In the aforementioned image lens assembly, when the first lens element has a concave image-side surface, the field of view of the lens assembly can be favorably enlarged. When the second lens element has a convex image-side surface, the positive refractive power of the second lens element can be strengthened, so that the aberration produced by the first lens assembly can be favorably corrected. When the third lens element has a concave object-side surface and a convex image-side surface, the astigmatism of the lens assembly can be favorably corrected.

DETAILED DESCRIPTION OF THE PREFERRED EMBODIMENTS

Figure 1A:
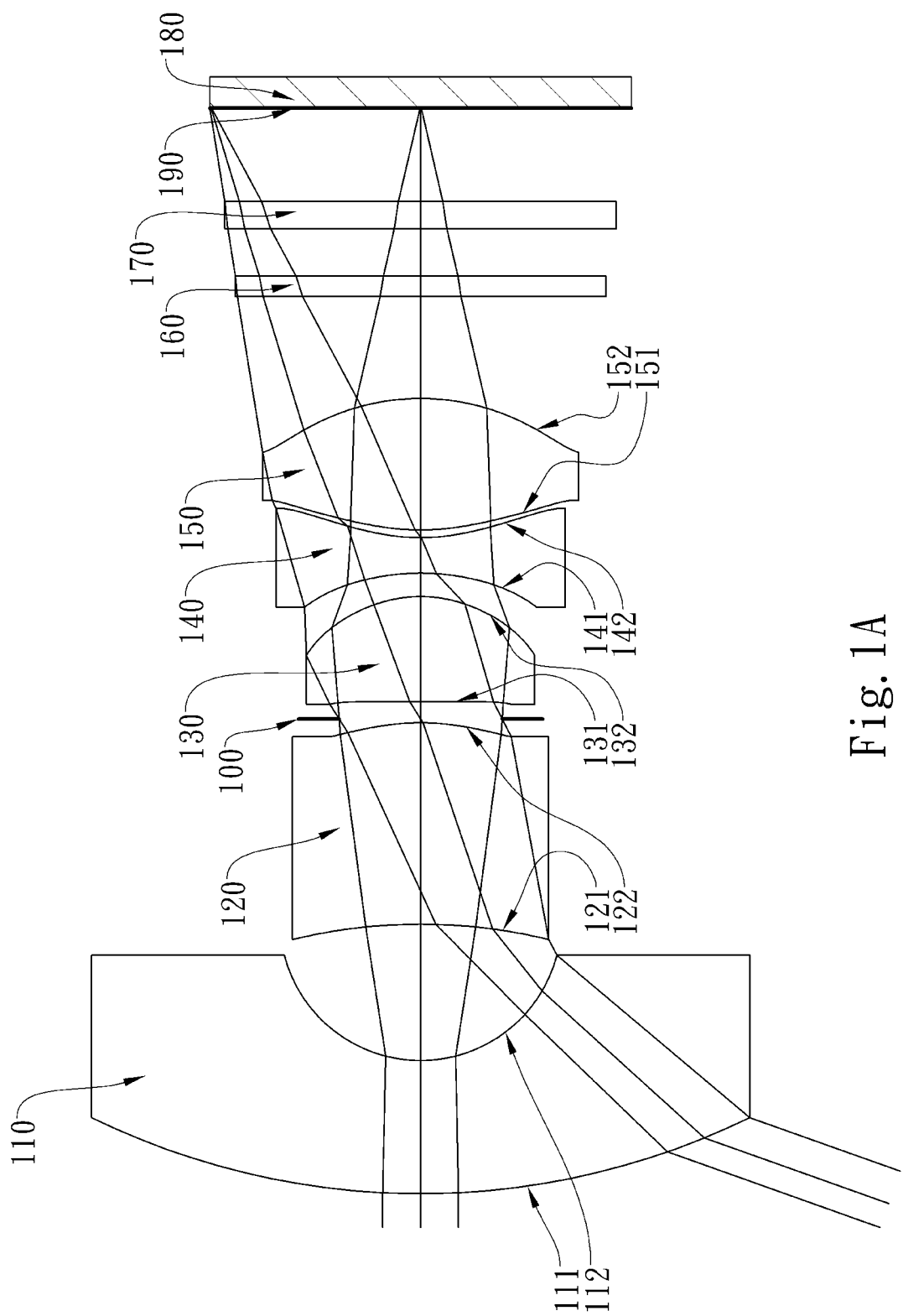
FIG. 1A shows an image lens assembly in accordance with a first embodiment of the present disclosure.

The present disclosure provides an image lens assembly comprising five lens elements with refractive power, in order from an object side to an image side: a first lens element with negative refractive power having a concave image-side surface; a second lens element with positive refractive power having a convex image-side surface; a third lens element with positive refractive power having a concave object-side surface and a convex image-side surface; a fourth lens element with negative refractive power; and a fifth lens element with positive refractive power; wherein a radius of the curvature of the image-side surface of the third lens element is R6, a radius of the curvature of the object-side surface of the fourth lens element is R7, an axial distance between the second lens element and the third lens element is T23, a central thickness of the second lens element is CT2, a focal length of the image lens assembly is f, a focal length of the first lens element is f1, a focal length of the second lens element is f2, and they satisfy the following relations: $|R6/R7|<0.85$; $0<T23/CT2<1.0$; and $0.7<|f/f1|+f/f2<2.4$.

When the relation of $|R6/R7|<0.85$ is satisfied, the aberration produced by the third lens element and the system can be favorably corrected by the fourth lens element, and the refractive power can be properly adjusted; as a result, image resolution of the system can be increased; preferably, the following relation is satisfied: $|R6/R7|<0.7$.

When the relation of $0<T23/CT2<1.0$ is satisfied, the space between the second and third lens elements and the thickness of the second lens element are not too large or too small, and thereby which is not only favorable for arrangement of lens elements, but also more efficient in use of space, for keeping the lens system compact; preferably, the following relation is satisfied: $0<T23/CT2<0.6$.

When the relation of $0.7<|f/f1|+f/f2<2.4$ is satisfied, the distribution of the refractive power of the first lens element and the second lens element is more proper for providing a moderate aberration correction of the lens assembly while enlarging the field of view of the system, thereby achieving a wide field of view and good image quality at the same time; preferably, the following relation is satisfied: $0.85<|f/f1|+f/f2<2.2$.

In the aforementioned image lens assembly, a focal length of the image lens assembly is f, a focal length of the first lens element is f1, and they preferably satisfy the following relation: $-1.6<f/f1<-0.58$. When the above relation is satisfied, the refractive power of the first lens element is more proper, thereby preventing the total track length from being excessively long.

In the aforementioned image lens assembly, a maximal field of view of the image lens assembly is FOV, and it preferably satisfies the following relation: 120 deg<FOV<180 deg. When the above relation is satisfied, sufficient field of view is provided for the lens assembly, thereby satisfying the high FOV demand for electronic products such as video cameras, automotive lens assemblies.

In the aforementioned image lens assembly, the focal length of the image lens assembly is f, a composite focal length of the first and second lens elements is f12, and they preferably satisfy the following relation: $0<f/f12<0.5$. When the above relation is satisfied, the positive refractive power of the lens assembly can be effectively shared by the first lens element and second lens element for preventing the distribution of the refractive power of the third lens element, the fourth lens element and the fifth lens element being too large, thereby reducing the effects resulted from the sensitivity of the lens assembly, manufacturing tolerances and environmental factors.

On the other hand, the present disclosure provides an image lens assembly comprising, in order from an object side to an image side, a front lens group having positive refractive power comprising two lens elements with refractive power, in order from the object side to the image side: a first lens element with negative refractive power having a concave image-side surface; and a second lens element with positive refractive power having a convex image-side surface; a stop; a rear lens group having positive refractive power comprising, in order from the object side to the image side: a third lens element with positive refractive power having a concave object-side surface and a convex image-side surface; a fourth lens element with negative refractive power; and a fifth lens element with positive refractive power, wherein a radius of the curvature of the image-side surface of the third lens element is R6, a radius of the curvature of the object-side surface of the fourth lens element is R7, an axial distance between the second lens element and the third lens element is T23, a central thickness of the second lens element is CT2, a focal length of the image lens assembly is f, a focal length of the first lens element is f1, a focal length of the second lens element is f2, and they satisfy the following relations: $|R6/R7|<0.85$; $0<T23/CT2<1.0$; and $0.7<|f/f1|+f/f2<2.4$.

When the relation of $|R6/R7|<0.85$ is satisfied, the aberration produced by the third lens element and the system can be favorably corrected by the fourth lens element, and the refractive power can be properly adjusted; as a result, image resolution of the system can be increased; preferably, the following relation is satisfied: $|R6/R7|<0.7$.

When the relation of $0<T23/CT2<1.0$ is satisfied, the space between the second and third lens elements and the thickness of the second lens element are not too large or too small, and thereby which is not only favorable for arrangement of lens elements, but also more efficient in use of space, for keeping the lens system compact; preferably, the following relation is satisfied: $0<T23/CT2<0.6$.

When the relation of $0.7<|f/f1|+f/f2<2.4$ is satisfied, the distribution of the refractive power of the first lens element and the second lens element is more proper for providing a moderate aberration correction of the lens assembly while enlarging the field of view of the system, thereby achieving a wide field of view and good image quality at the same time; preferably, the following relation is satisfied: $0.85<|f/f1|+f/f2<2.2$.

In the aforementioned image lens assembly, a radius of the curvature of the image-side surface of the fourth lens element is R8, a radius of the curvature of the object-side surface of the fifth lens element is R9, the focal length of the image lens assembly is f, and they preferably satisfy the following relation: $0.12<|R8-R9|/f<2.5$. When the above relation is satisfied, the high-order aberration can be favorably corrected, thereby achieving good image quality under the condition with a wide field of view for the lens assembly.

Furthermore, the present disclosure provides an image lens assembly comprising five lens elements with refractive power, in order from an object side to an image side: a first lens element with negative refractive power having a concave image-side surface; a second lens element with positive refractive power having a concave object-side surface and a convex image-side surface; a third lens element with positive refractive power having a convex image-side surface; a fourth lens element with negative refractive power, at least one of the object-side and the image-side surfaces thereof being aspheric, and the fourth lens element is made of plastic; and a fifth lens element with positive refractive power, at least one of the object-side and the image-side surfaces thereof being aspheric, and the fifth lens element is made of plastic; wherein a radius of the curvature of the image-side surface of the third lens element is R6, a radius of the curvature of the object-side surface of the third lens element is R5, a radius of the curvature of the object-side surface of the fourth lens element is R7, an axial distance between the second lens element and the third lens element is T23, a central thickness of the second lens element is CT2, a focal length of the image lens assembly is f, a focal length of the first lens element is f1, a focal length of the second lens element is f2, and they satisfy the following relations: $|R6/R5|<0.6$; $|R6/R7|<0.85$; $0<T23/CT2<1.0$; and $0.7<|f/f1|+f/f2<2.4$ When the relation of $|R6/R5|<0.6$ is satisfied, the spherical aberration of the system can be favorably corrected; as a result, the refractive power of the system can be properly distributed, thereby lowering the sensitivity of the system.

When the relation of $|R6/R7|<0.85$ is satisfied, the aberration produced by the third lens element and the system can be favorably corrected by the fourth lens element, and the refractive power can be properly adjusted; as a result, image resolution of the system can be increased.

When the relation of $0<T23/CT2<1.0$ is satisfied, the space between the second and third lens elements and the thickness of the second lens element are not too large or too small, and thereby which is not only favorable for arrangement of lens elements, but also more efficient in use of space, for keeping the lens system compact.

When the relation of $0.7<|f/f1|+f/f2<2.4$ is satisfied, the distribution of the refractive power of the first lens element and the second lens element is more proper for providing a moderate aberration correction of the lens assembly while enlarging the field of view of the system, thereby achieving a wide field of view and good image quality at the same time; preferably, the following relation is satisfied: $0.85<|f/f1|+f/f2<2.2$.

In the aforementioned image lens assembly, a radius of the curvature of the image-side surface of the fourth lens element is R8, a radius of the curvature of the object-side surface of the fifth lens element is R9, the focal length of the image lens assembly is f, and they preferably satisfy the following relation: $0.12<|R8-R9|/f<2.5$. When the above relation is satisfied, the high-order aberration can be favorably corrected, thereby achieving good image quality under the condition with a wide field of view for the lens assembly.

In the aforementioned image lens assembly, the focal length of the image lens assembly is f, a composite focal length of the first and second lens elements is f12, and they preferably satisfy the following relation: $0<f/f12<0.5$. When the above relation is satisfied, the positive refractive power of the lens assembly can be effectively controlled by the first lens element and second lens element for preventing the distribution of the refractive power of the third lens element, the fourth lens element and the fifth lens element being too large, thereby reducing the effects resulted from the sensitivity of the lens assembly, manufacturing tolerances and environmental factors.

In the aforementioned image lens assembly, the lens elements can be made of glass or plastic material. If the lens elements are made of glass, the freedom for distributing the refractive power of the image lens assembly can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the image lens assembly can be effectively reduced.

In the present image lens assembly, if a lens element has a convex surface, it means the portion of the surface in proximity to the optical axis is convex; if a lens element has a concave surface, it means the portion of the surface in proximity to the optical axis is concave.

In the present image lens assembly, there can be at least one stop, such as a glare stop or a field stop, provided for eliminating stray light and thereby improving image resolution thereof.

Preferred embodiments of the present disclosure will be described in the following paragraphs by referring to the accompanying drawings.

Embodiment 1

Figure 1B:
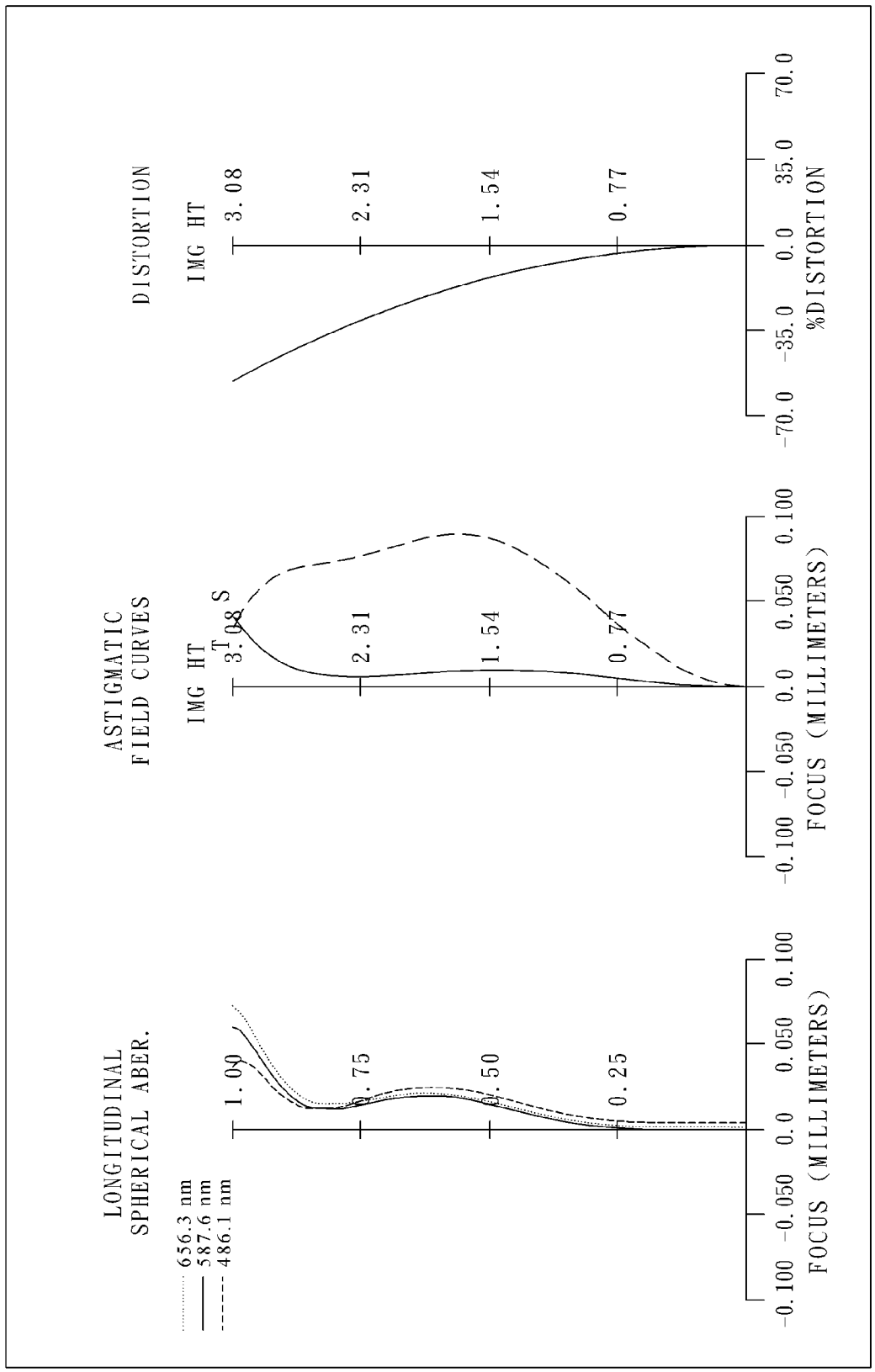
FIG. 1B shows the aberration curves of the first embodiment of the present disclosure.

FIG. 1A shows an image lens assembly in accordance with the first embodiment of the present disclosure, and FIG. 1B shows the aberration curves of the first embodiment of the present disclosure. The image lens assembly of the first embodiment of the present disclosure comprises five lens elements, in order from an object side to an image side:

a first lens element 110 made of glass with negative refractive power having a convex object-side surface 111 and a concave image-side surface 112, the object-side and image-side surfaces 111 and 112 thereof being spherical;

a second lens element 120 made of plastic with positive refractive power having a concave object-side surface 121 and a convex image-side surface 122, the object-side and image-side surfaces 121 and 122 thereof being aspheric;

a third lens element 130 made of plastic with positive refractive power having a concave object-side surface 131 and a convex image-side surface 132, the object-side and image-side surfaces 131 and 132 thereof being aspheric;

a fourth lens element 140 made of plastic with negative refractive power having a concave object-side surface 141 and a concave image-side surface 142, the object-side and image-side surfaces 141 and 142 thereof being aspheric; and a fifth lens element 150 made of plastic with positive refractive power having a convex object-side surface 151 and a convex image-side surface 152, the object-side and image-side surfaces 151 and 152 thereof being aspheric;

wherein an aperture stop 100 is disposed between the second lens element 120 and the third lens element 130;

the image lens assembly further comprises an IR filter 160 disposed between the image-side surface 152 of the fifth lens element 150 and a cover glass 170, and the IR filter 160 and the cover glass 170 are made of glass and have no influence on the focal length of the image lens assembly; the image lens assembly further comprises an image sensor 180 provided on an image plane 190.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 2.45 mm, Fno = 2.20, HFOV = 70.4 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Lens 1 | 11.028 | 1.961 | Glass | 1.729 | 54.5 | −3.86 |
| 2 |  | 2.074 | 2.006 |  |  |  |  |
| 3 | Lens 2 | −8.881100 (ASP) | 2.970 | Plastic | 1.640 | 23.3 | 7.18 |
| 4 |  | −3.421400 (ASP) | 0.057 |  |  |  |  |
| 5 | Ape. Stop | Plano | 0.256 |  |  |  |  |
| 6 | Lens 3 | −47.103200 (ASP) | 1.547 | Plastic | 1.544 | 55.9 | 3.60 |
| 7 |  | −1.904400 (ASP) | 0.344 |  |  |  |  |
| 8 | Lens 4 | −3.410700 (ASP) | 0.523 | Plastic | 1.640 | 23.3 | −2.40 |
| 9 |  | 2.950650 (ASP) | 0.114 |  |  |  |  |
| 10 | Lens 5 | 3.493200 (ASP) | 1.937 | Plastic | 1.544 | 55.9 | 3.49 |
| 11 |  | −3.356500 (ASP) | 1.500 |  |  |  |  |
| 12 | IR-filter | Plano | 0.300 | Glass | 1.516 | 64.1 | — |
| 13 |  | Plano | 0.700 |  |  |  |  |
| 14 | Cover-glass | Plano | 0.400 | Glass | 1.516 | 64.1 | — |
| 15 |  | Plano | 1.375 |  |  |  |  |
| 16 | Image | Plano | — |  |  |  |  |

\* Reference wavelength is d-line 587.6 nm

TABLE 2

Aspheric Coefficients

| Surface # | | | | | | | |
|---|---|---|---|---|---|---|---|
| 3 | 4 | 6 | 7 | 8 | 9 | 10 | 11 |
| k = −4.67843E+00 | −4.28445E+00 | 0.00000E+00 | 0.00000E+00 | 0.00000E+00 | 0.00000E+00 | −3.73086E+00 | −5.66751E−01 |
| A4 = −4.54676E−03 | 9.03017E−03 | 1.31848E−02 | 2.82007E−02 | 8.18706E−03 | −2.55100E−02 | −1.05006E−02 | −1.11811E−03 |
| A6 = 6.51197E−04 | −2.71627E−05 | −1.17817E−02 | −6.99053E−03 | −4.73807E−03 | 1.65282E−03 | 1.23162E−04 | −2.99417E−04 |
| A8 = −4.57139E−05 | −1.46731E−03 | 4.77215E−03 | 1.98245E−03 | −6.36175E−04 | 1.39926E−04 | 7.40216E−04 | −2.31266E−05 |
| A10 = 1.12902E−05 | 7.70432E−04 | −2.47563E−03 | −2.83987E−04 | 2.53775E−04 | −8.71522E−05 | −7.87256E−05 | 1.95627E−05 |
| A12 = | | | | | | −1.81574E−05 | 2.24383E−06 |
| A14 = | | | | | | 2.20904E−06 | 7.18540E−08 |

The equation of the aspheric surface profiles is expressed as follows:

$$X(Y) = (Y^2/R) \Big/ \left(1 + sqrt\big(1 - (1+k)*(Y/R)^2\big)\right) + \sum_{i} (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

R: curvature radius;

k: the conic coefficient;

Ai: the aspheric coefficient of order i.

In the first embodiment of the present image lens assembly, the focal length of the image lens assembly is f, and it satisfies the following relation: f=2.45 (mm).

In the first embodiment of the present image lens assembly, the f-number of the image lens assembly is Fno, and it satisfies the relation: Fno=2.20.

In the first embodiment of the present image lens assembly, half of the maximal field of view of the image lens assembly is HFOV, and it satisfies the relation: HFOV=70.4 deg.

In the first embodiment of the present image lens assembly, an axial distance between the second lens element 120 and the third lens element 130 is T23, a central thickness of the second lens element 120 is CT2, and they satisfy the relation: T23/CT2=0.11.

In the first embodiment of the present image lens assembly, a radius of the curvature of the image-side surface 132 of the third lens element 130 is R6, a radius of the curvature of the object-side surface 131 of the third lens element 130 is R5, and they satisfy the relation: |R6/R5|=0.04.

In the first embodiment of the present image lens assembly, the radius of the curvature of the image-side surface 132 of the third lens element 130 is R6, a radius of the curvature of the object-side surface 141 of the fourth lens element 140 is R7, and they satisfy the relation: |R6/R7|=0.56.

In the first embodiment of the present image lens assembly, a radius of the curvature of the image-side surface 142 of the fourth lens element 140 is R8, a radius of the curvature of the object-side surface 151 of the fifth lens element 150 is R9, the focal length of the image lens assembly is f, and they satisfy the relation: |R8−R9|/f=0.22.

In the first embodiment of the present image lens assembly, the focal length of the image lens assembly is f, a focal length of the first lens element 110 is f1, and they satisfy the relation: f/f1=−0.64.

In the first embodiment of the present image lens assembly, the focal length of the image lens assembly is f, the focal length of the first lens element 110 is f1, the focal length of the second lens element 120 is f2, and they satisfy the relation: |f/f1|+f/f2=0.98.

In the first embodiment of the present image lens assembly, the focal length of the image lens assembly is f, a composite focal length of the first lens element 110 and the second lens element 120 is f12, and they satisfy the relation: f/f12=0.07.

In the first embodiment of the present image lens assembly, a maximal field of view of the image lens assembly is FOV, and it satisfies the relation: FOV=140.8 deg.

Embodiment 2

Figure 2A:
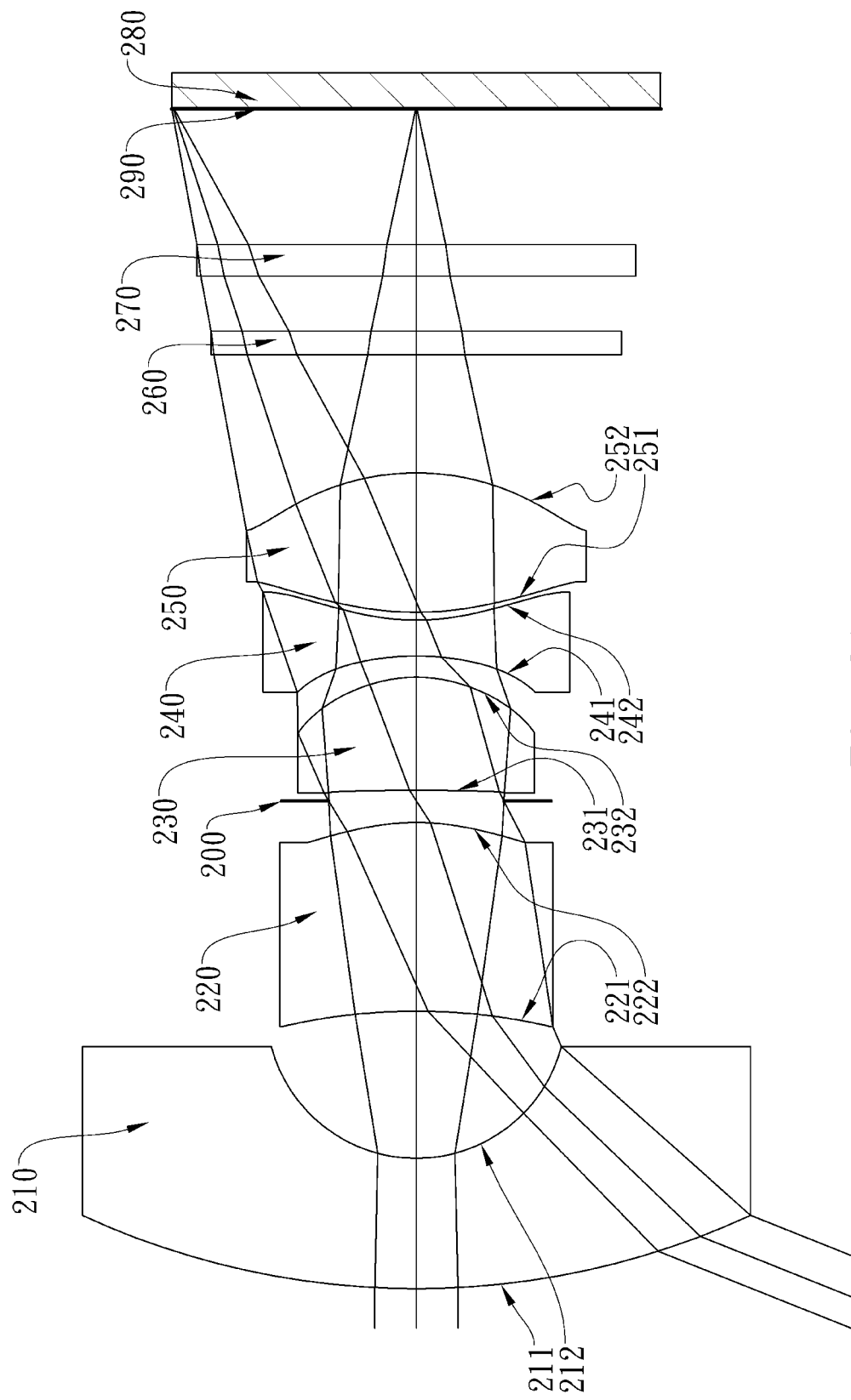
FIG. 2A shows an image lens assembly in accordance with a second embodiment of the present disclosure.
Figure 2B:
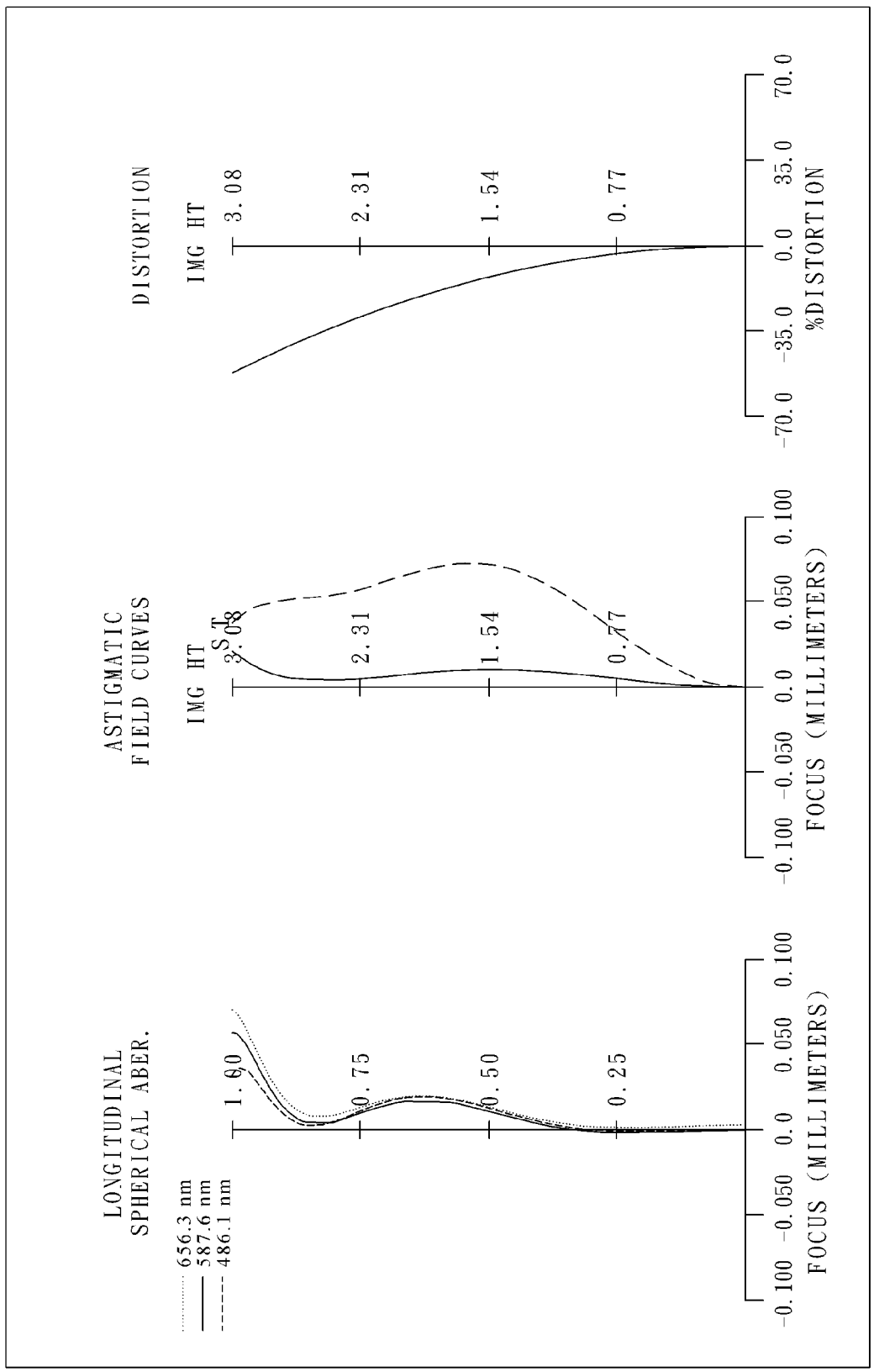
FIG. 2B shows the aberration curves of the second embodiment of the present disclosure.

FIG. 2A shows an image lens assembly in accordance with the second embodiment of the present disclosure, and FIG. 2B shows the aberration curves of the second embodiment of the present disclosure. The image lens assembly of the second embodiment of the present disclosure comprises five lens elements, in order from an object side to an image side:

a first lens element 210 made of glass with negative refractive power having a convex object-side surface 211 and a concave image-side surface 212, the object-side and image-side surfaces 211 and 212 thereof being spherical;

a second lens element 220 made of plastic with positive refractive power having a concave object-side surface 221 and a convex image-side surface 222, the object-side and image-side surfaces 221 and 222 thereof being aspheric;

a third lens element 230 made of plastic with positive refractive power having a concave object-side surface 231 and a convex image-side surface 232, the object-side and image-side surfaces 231 and 232 thereof being aspheric;

a fourth lens element 240 made of plastic with negative refractive power having a concave object-side surface 241 and a concave image-side surface 242, the object-side and image-side surfaces 241 and 242 thereof being aspheric; and a fifth lens element 250 made of plastic with positive refractive power having a convex object-side surface 251 and a convex image-side surface 252, the object-side and image-side surfaces 251 and 252 thereof being aspheric;

wherein an aperture stop 200 is disposed between the second lens element 220 and the third lens element 230;

the image lens assembly further comprises an IR filter 260 disposed between the image-side surface 252 of the fifth lens element 250 and a cover glass 270, and the IR filter 260 and the cover glass 270 are made of glass and have no influence on the focal length of the image lens assembly; the image lens assembly further comprises an image sensor 280 provided on an image plane 290.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 2.53 mm, Fno = 2.40, HFOV = 68.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 10.111 | 1.657 | Glass | 1.729 | 54.5 | −3.51 |
| 2 | | 1.902 | 1.869 | | | | |
| 3 | Lens 2 | −8.293300 (ASP) | 2.400 | Plastic | 1.634 | 23.8 | 6.39 |
| 4 | | −3.026200 (ASP) | 0.274 | | | | |
| 5 | Ape. Stop | Plano | 0.134 | | | | |
| 6 | Lens 3 | −19.607800 (ASP) | 1.439 | Plastic | 1.544 | 55.9 | 3.57 |
| 7 | | −1.813600 (ASP) | 0.269 | | | | |
| 8 | Lens 4 | −3.408600 (ASP) | 0.456 | Plastic | 1.634 | 23.8 | −2.42 |
| 9 | | 2.925760 (ASP) | 0.100 | | | | |

TABLE 3-continued (Embodiment 2)
f = 2.53 mm, Fno = 2.40, HFOV = 68.2 deg.

| Surface # | | Curvature Radius | Thickness | Material | Index | Abbe # | Focal length |
|---|---|---|---|---|---|---|---|
| 10 | Lens 5 | 3.834500 (ASP) | 1.772 | Plastic | 1.535 | 56.3 | 3.54 |
| 11 | | −3.135000 (ASP) | 1.500 | | | | |
| 12 | IR-filter | Plano | 0.300 | Glass | 1.516 | 64.1 | — |
| 13 | | Plano | 0.700 | | | | |
| 14 | Cover-glass | Plano | 0.400 | Glass | 1.516 | 64.1 | — |
| 15 | | Plano | 1.726 | | | | |
| 16 | Image | Plano | — | | | | |

* Reference wavelength is d-line 587.6 nm

TABLE 4

Aspheric Coefficients

| | Surface # | | | | | | | |
|---|---|---|---|---|---|---|---|---|
| | 3 | 4 | 6 | 7 | 8 | 9 | 10 | 11 |
| k = | −7.65905E+00 | −9.54919E+00 | 0.00000E+00 | 8.89252E−02 | 4.84457E−01 | −1.51605E−01 | −1.03294E+00 | −5.75838E−01 |
| A4 = | −6.14447E−03 | −1.37364E−02 | 2.76305E−02 | 4.79143E−02 | 1.02701E−02 | −2.63906E−02 | −1.10959E−02 | −2.39835E−03 |
| A6 = | 1.09836E−03 | 7.27263E−03 | −2.84910E−02 | −2.25453E−02 | −1.97581E−02 | 1.68226E−03 | −2.06943E−04 | −4.94646E−04 |
| A8 = | −1.30345E−04 | −2.19100E−03 | 1.84679E−03 | 8.40698E−03 | 5.10034E−03 | 1.13122E−04 | 8.86891E−04 | 6.15197E−05 |
| A10 = | 2.48784E−05 | 3.93655E−04 | −8.79487E−03 | −1.43868E−03 | −8.43663E−04 | −1.36991E−04 | −1.67666E−04 | 3.04165E−05 |
| A12 = | | | | | | | −1.48324E−05 | 3.59946E−06 |
| A14 = | | | | | | | 3.61070E−06 | 3.69559E−07 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| f | 2.53 | |R8 − R9|/f | 0.36 |
|---|---|---|---|
| FNO | 2.40 | f/f1 | −0.72 |
| HFOV | 68.2 | |f/f1| + f/f2 | 1.12 |
| T23/CT2 | 0.17 | f/f12 | 0.08 |
| |R6/R5| | 0.09 | FOV | 136.4 |
| |R6/R7| | 0.53 | | |

Embodiment 3

Figure 3A:
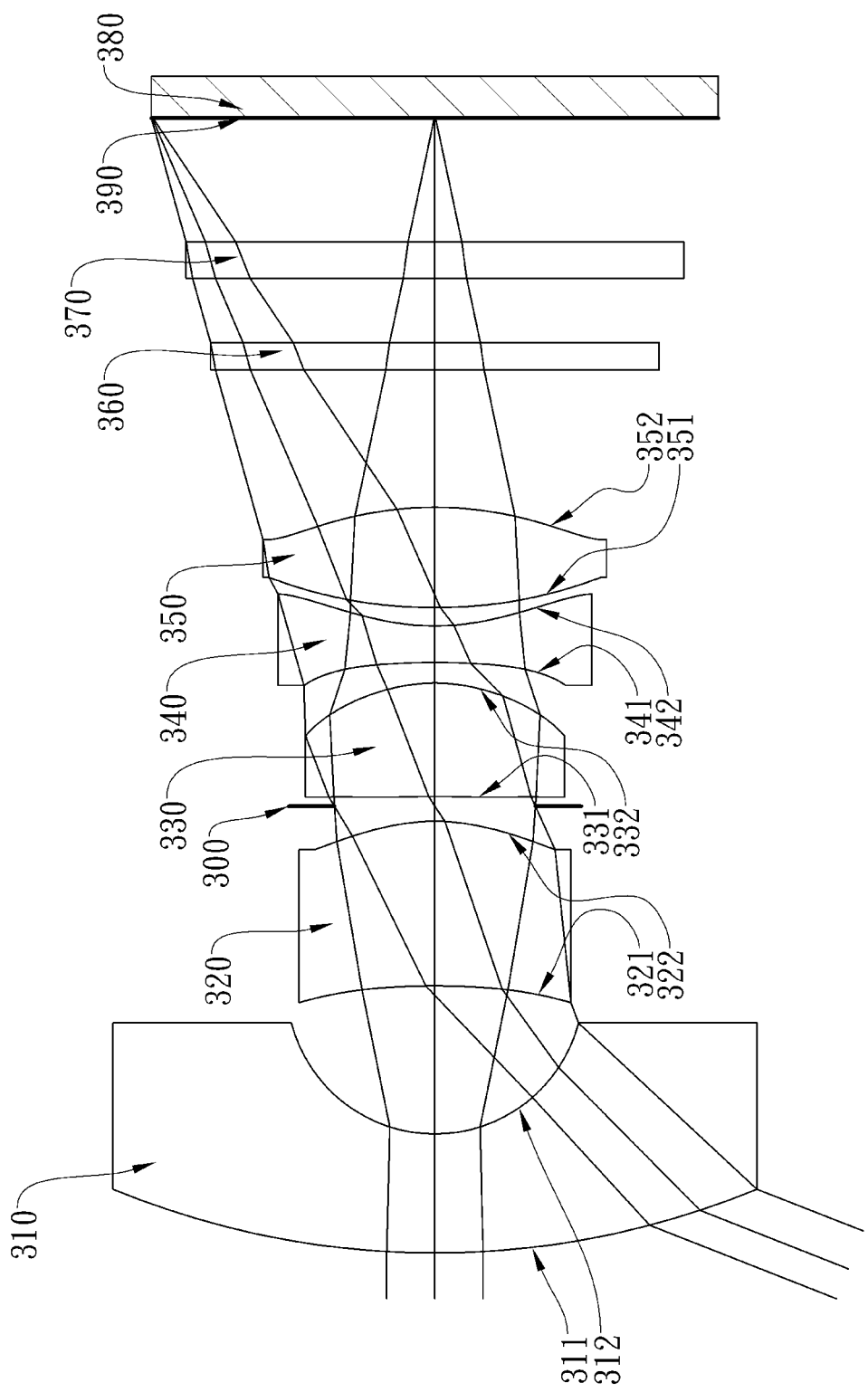
FIG. 3A shows an image lens assembly in accordance with a third embodiment of the present disclosure.
Figure 3B:
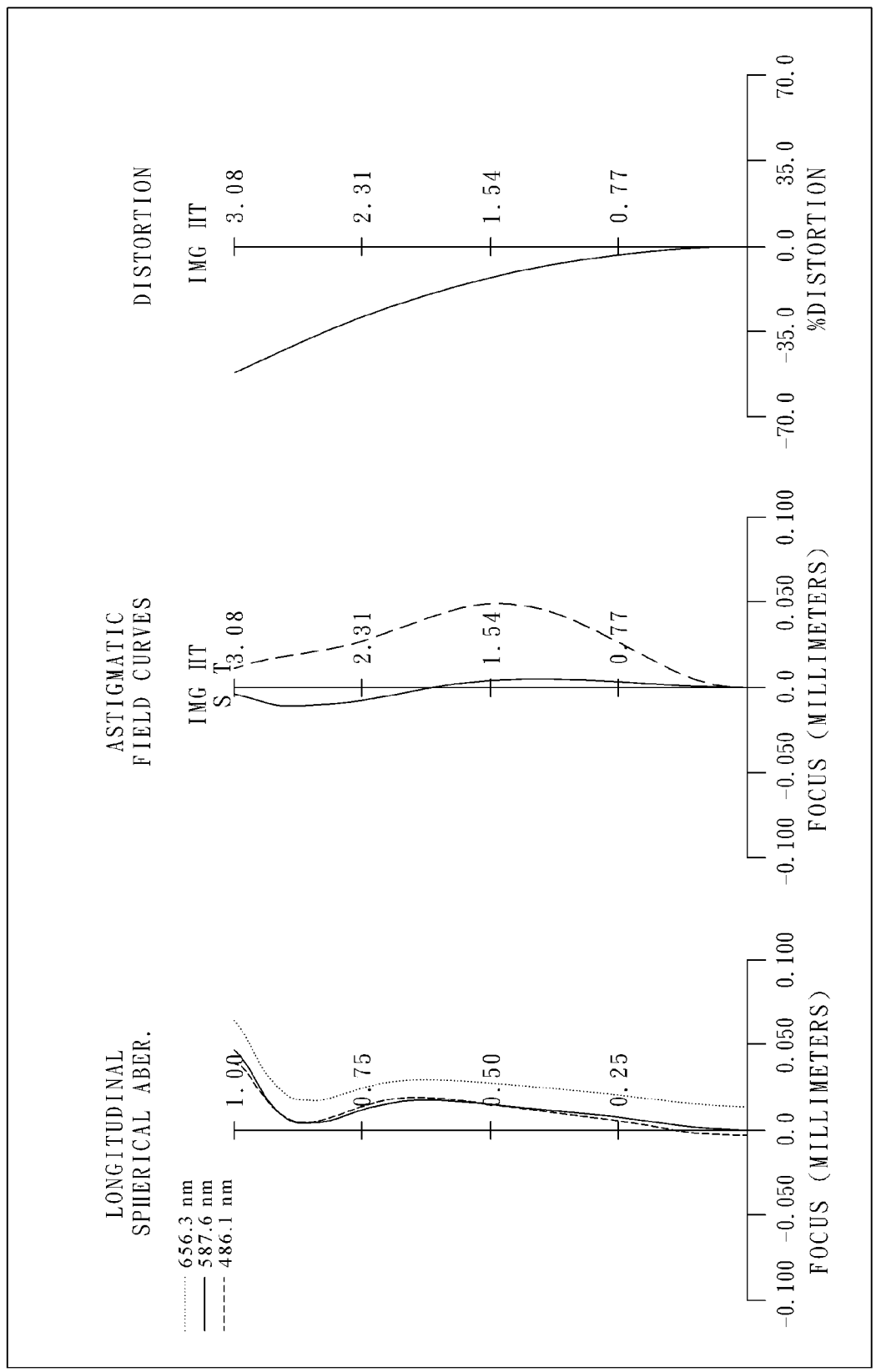
FIG. 3B shows the aberration curves of the third embodiment of the present disclosure.

FIG. 3A shows an image lens assembly in accordance with the third embodiment of the present disclosure, and FIG. 3B shows the aberration curves of the third embodiment of the present disclosure. The image lens assembly of the third embodiment of the present disclosure comprises five lens elements, in order from an object side to an image side:

a first lens element 310 made of glass with negative refractive power having a convex object-side surface 311 and a concave image-side surface 312, the object-side and image-side surfaces 311 and 312 thereof being spherical;

a second lens element 320 made of plastic with positive refractive power having a concave object-side surface 321 and a convex image-side surface 322, the object-side and image-side surfaces 321 and 322 thereof being aspheric;

a third lens element 330 made of plastic with positive refractive power having a concave object-side surface 331 and a convex image-side surface 332, the object-side and image-side surfaces 331 and 332 thereof being aspheric;

a fourth lens element 340 made of plastic with negative refractive power having a concave object-side surface 341 and a concave image-side surface 342, the object-side and image-side surfaces 341 and 342 thereof being aspheric; and a fifth lens element 350 made of plastic with positive refractive power having a convex object-side surface 351 and a convex image-side surface 352, the object-side and image-side surfaces 351 and 352 thereof being aspheric;

wherein an aperture stop 300 is disposed between the second lens element 320 and the third lens element 330;

the image lens assembly further comprises an IR filter 360 disposed between the image-side surface 352 of the fifth lens element 350 and a cover glass 370, and the IR filter 360 and the cover glass 370 are made of glass and have no influence on the focal length of the image lens assembly; the image lens assembly further comprises an image sensor 380 provided on an image plane 390.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 2.53 mm, Fno = 2.40, HFOV = 68.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 9.195 | 1.300 | Glass | 1.729 | 54.5 | −2.90 |
| 2 | | 1.618 | 1.615 | | | | |
| 3 | Lens 2 | −9.040400 (ASP) | 1.800 | Plastic | 1.583 | 30.2 | 4.44 |
| 4 | | −2.161770 (ASP) | 0.164 | | | | |
| 5 | Ape. Stop | Plano | 0.105 | | | | |
| 6 | Lens 3 | −13.587000 (ASP) | 1.240 | Plastic | 1.535 | 56.3 | 3.91 |
| 7 | | −1.870420 (ASP) | 0.224 | | | | |
| 8 | Lens 4 | −9.231900 (ASP) | 0.400 | Plastic | 1.650 | 21.4 | −3.03 |
| 9 | | 2.539990 (ASP) | 0.200 | | | | |
| 10 | Lens 5 | 5.335400 (ASP) | 1.095 | Plastic | 1.535 | 56.3 | 4.45 |
| 11 | | −3.983300 (ASP) | 1.500 | | | | |
| 12 | IR-filter | Plano | 0.300 | Glass | 1.516 | 64.1 | — |
| 13 | | Plano | 0.700 | | | | |
| 14 | Cover-glass | Plano | 0.400 | Glass | 1.516 | 64.1 | — |
| 15 | | Plano | 1.351 | | | | |
| 16 | Image | Plano | — | | | | |

* Reference wavelength is d-line 587.6 nm

TABLE 7

Aspheric Coefficients

| | Surface # | | | | | | | |
|---|---|---|---|---|---|---|---|---|
| | 3 | 4 | 6 | 7 | 8 | 9 | 10 | 11 |
| k = | 1.61470E+01 | −8.17628E+00 | 0.00000E+00 | 2.35188E−01 | 2.36986E+01 | −7.04650E−01 | 5.16246E+00 | −1.34687E+00 |
| A4 = | −1.36755E−02 | −3.08536E−02 | 6.86779E−02 | 5.89517E−02 | −4.00194E−03 | −3.19753E−02 | 9.68706E−04 | −2.40266E−03 |
| A6 = | 2.21450E−03 | 1.81060E−02 | −5.47509E−02 | −3.49810E−02 | −2.41199E−02 | 2.82997E−03 | −4.96838E−03 | −8.82191E−04 |
| A8 = | −1.32765E−04 | −6.94032E−03 | 3.09587E−02 | 1.75655E−02 | 1.27459E−02 | 4.77338E−04 | 1.95111E−03 | 6.43892E−04 |
| A10 = | 1.10929E−04 | 1.50586E−03 | −1.08058E−02 | −3.82682E−03 | −3.22090E−03 | −3.68853E−04 | −3.30944E−04 | 7.54818E−05 |
| A12 = | | | | | | | −1.48324E−05 | 3.59946E−06 |
| A14 = | | | | | | | 3.61070E−06 | 3.69559E−07 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| f | 2.53 | |R8 − R9|/f | 1.10 |
|---|---|---|---|
| FNO | 2.40 | f/f1 | −0.87 |
| HFOV | 68.5 | |f/f1| + f/f2 | 1.44 |
| T23/CT2 | 0.15 | f/f12 | 0.25 |
| |R6/R5| | 0.14 | FOV | 137.0 |
| |R6/R7| | 0.20 | | |

Embodiment 4

Figure 4A:
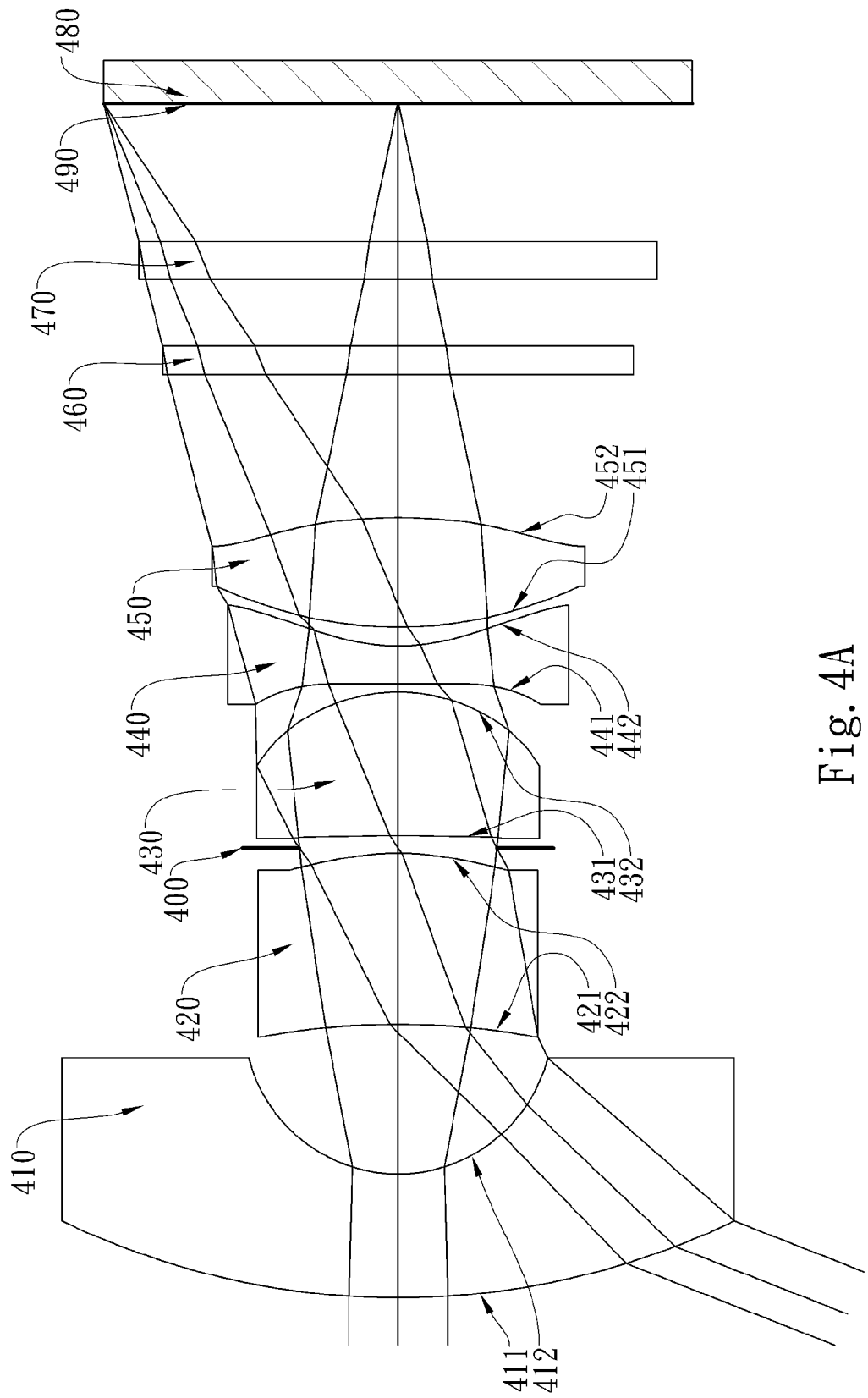
FIG. 4A shows an image lens assembly in accordance with a fourth embodiment of the present disclosure.
Figure 4B:
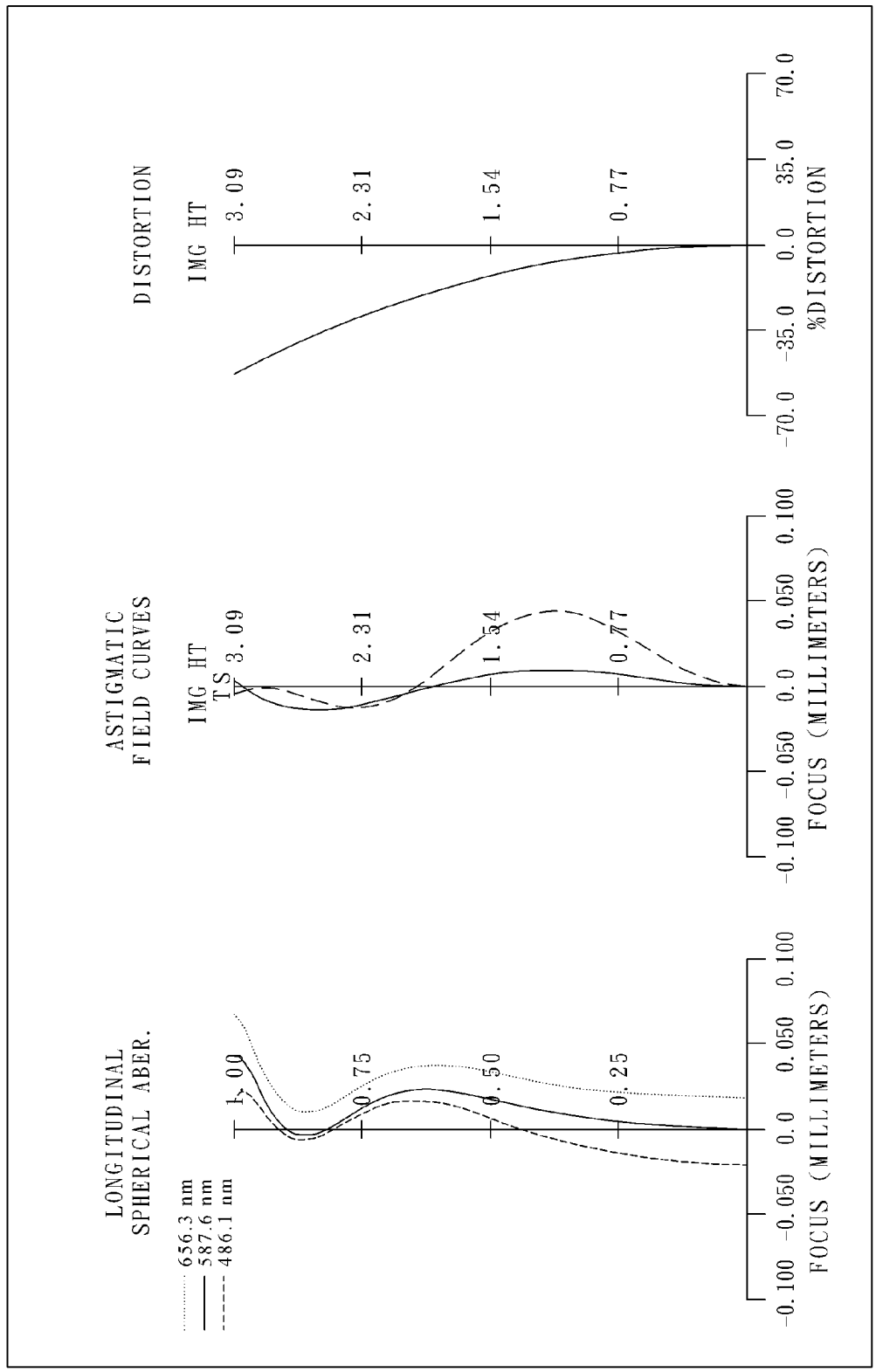
FIG. 4B shows the aberration curves of the fourth embodiment of the present disclosure.

FIG. 4A shows an image lens assembly in accordance with the fourth embodiment of the present disclosure, and FIG. 4B shows the aberration curves of the fourth embodiment of the present disclosure. The image lens assembly of the fourth embodiment of the present disclosure comprises five lens elements, in order from an object side to an image side:

a first lens element 410 made of glass with negative refractive power having a convex object-side surface 411 and a concave image-side surface 412, the object-side and image-side surfaces 411 and 412 thereof being spherical;

a second lens element 420 made of plastic with positive refractive power having a concave object-side surface 421 and a convex image-side surface 422, the object-side and image-side surfaces 421 and 422 thereof being aspheric;

a third lens element 430 made of plastic with positive refractive power having a concave object-side surface 431 and a convex image-side surface 432, the object-side and image-side surfaces 431 and 432 thereof being aspheric;

a fourth lens element 440 made of plastic with negative refractive power having a convex object-side surface 441 and a concave image-side surface 442, the object-side and image-side surfaces 441 and 442 thereof being aspheric; and a fifth lens element 450 made of plastic with positive refractive power having a convex object-side surface 451 and a convex image-side surface 452, the object-side and image-side surfaces 451 and 452 thereof being aspheric;

wherein an aperture stop 400 is disposed between the second lens element 420 and the third lens element 430;

the image lens assembly further comprises an IR filter 460 disposed between the image-side surface 452 of the fifth lens element 450 and a cover glass 470, and the IR filter 460 and the cover glass 470 are made of glass and have no influence on the focal length of the image lens assembly; the image lens assembly further comprises an image sensor 480 provided on an image plane 490.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

TABLE 9

(Embodiment 4)
f = 2.55 mm, Fno = 2.45, HFOV = 68.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 8.126 | 1.300 | Glass | 1.729 | 54.5 | −3.03 |
| 2 | | 1.620 | 1.567 | | | | |
| 3 | Lens 2 | −9.927500 (ASP) | 1.800 | Plastic | 1.633 | 23.4 | 5.66 |
| 4 | | −2.817700 (ASP) | 0.055 | | | | |
| 5 | Ape. Stop | Plano | 0.130 | | | | |
| 6 | Lens 3 | −13.587000 (ASP) | 1.509 | Plastic | 1.535 | 56.3 | 3.59 |
| 7 | | −1.748560 (ASP) | 0.080 | | | | |
| 8 | Lens 4 | 17.730500 (ASP) | 0.400 | Plastic | 1.650 | 21.4 | −3.50 |
| 9 | | 1.998380 (ASP) | 0.200 | | | | |
| 10 | Lens 5 | 4.553000 (ASP) | 1.150 | Plastic | 1.535 | 56.3 | 4.85 |
| 11 | | −5.496000 (ASP) | 1.500 | | | | |
| 12 | IR-filter | Plano | 0.300 | Glass | 1.516 | 64.1 | — |
| 13 | | Plano | 0.700 | | | | |
| 14 | Cover-glass | Plano | 0.400 | Glass | 1.516 | 64.1 | — |
| 15 | | Plano | 1.443 | | | | |
| 16 | Image | Plano | — | | | | |

* Reference wavelength is d-line 587.6 nm

TABLE 10

Aspheric Coefficients

| | Surface # | | | | | | | |
|---|---|---|---|---|---|---|---|---|
| | 3 | 4 | 6 | 7 | 8 | 9 | 10 | 11 |
| k = | −2.13859E+00 | −1.59060E+01 | 0.00000E+00 | 1.08422E−01 | −5.00000E+01 | −1.48364E+00 | 1.79192E+00 | −3.84245E−02 |
| A4 = | −1.09536E−02 | −2.58102E−02 | 5.93376E−02 | 4.99399E−02 | −3.70568E−02 | −4.10410E−02 | 8.73706E−03 | −5.46959E−03 |
| A6 = | 2.66222E−03 | 2.16343E−02 | −6.25643E−02 | −3.91550E−02 | −2.35319E−02 | 4.12371E−03 | −7.36253E−03 | −8.07794E−04 |
| A8 = | −5.37786E−05 | −7.41460E−03 | 4.26813E−02 | 1.88719E−02 | 1.19981E−02 | 6.82640E−04 | 1.83771E−03 | 9.26050E−04 |
| A10 = | −1.55653E−05 | 8.18204E−04 | −2.03493E−02 | −3.53794E−03 | −2.23431E−03 | −2.72985E−04 | −1.81100E−04 | −3.32626E−05 |
| A12 = | | | | | | | −1.48324E−05 | 3.59946E−06 |
| A14 = | | | | | | | 3.61070E−06 | 3.69559E−07 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f | 2.55 | |R8 − R9|/f | 1.00 |
|---|---|---|---|
| FNO | 2.45 | f/f1 | −0.84 |
| HFOV | 68.6 | |f/f1| + f/f2 | 1.29 |
| T23/CT2 | 0.10 | f/f12 | 0.02 |
| |R6/R5| | 0.13 | FOV | 137.2 |
| |R6/R7| | 0.10 | | |

Embodiment 5

Figure 5A:
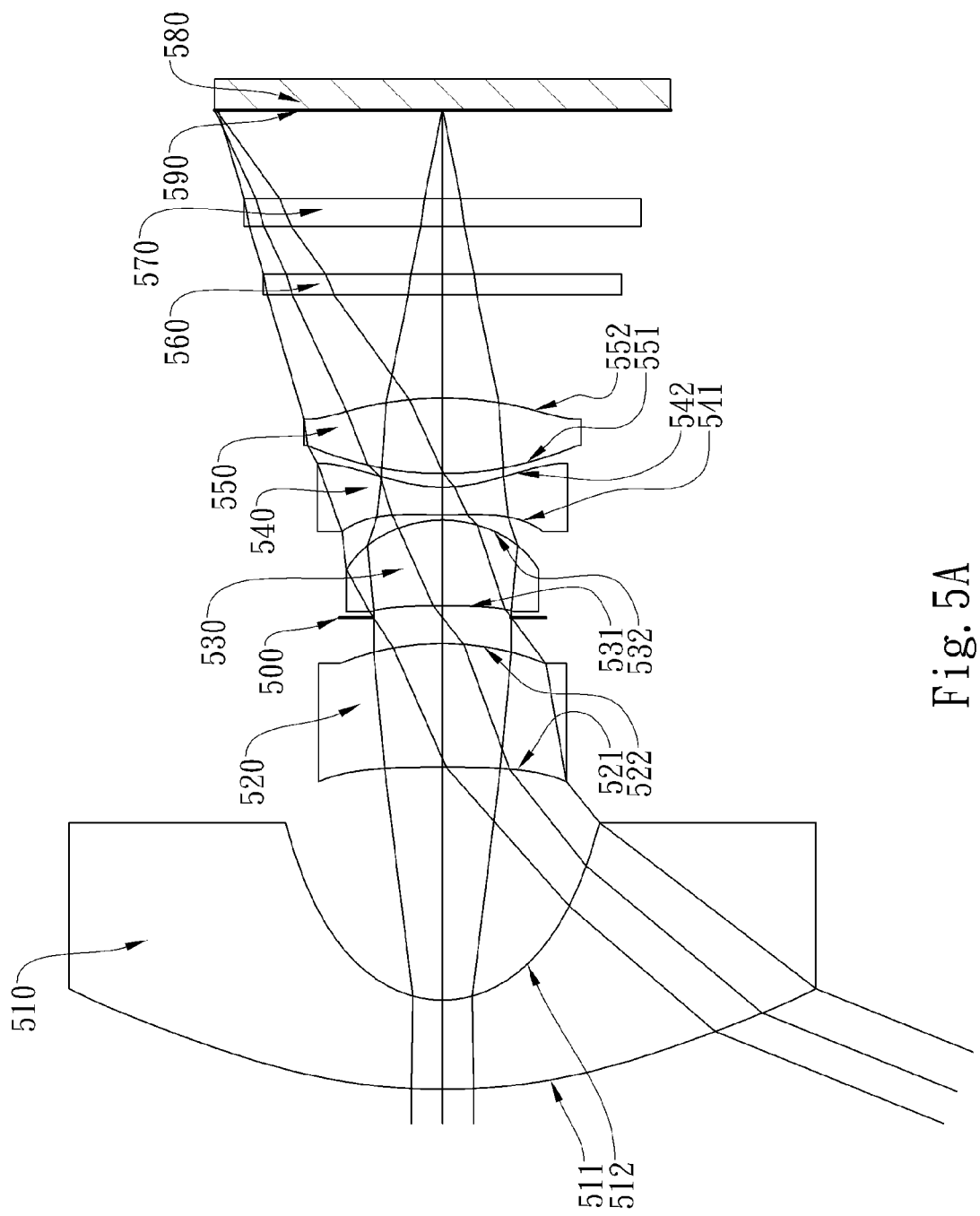
FIG. 5A shows an image lens assembly in accordance with a fifth embodiment of the present disclosure.
Figure 5B:
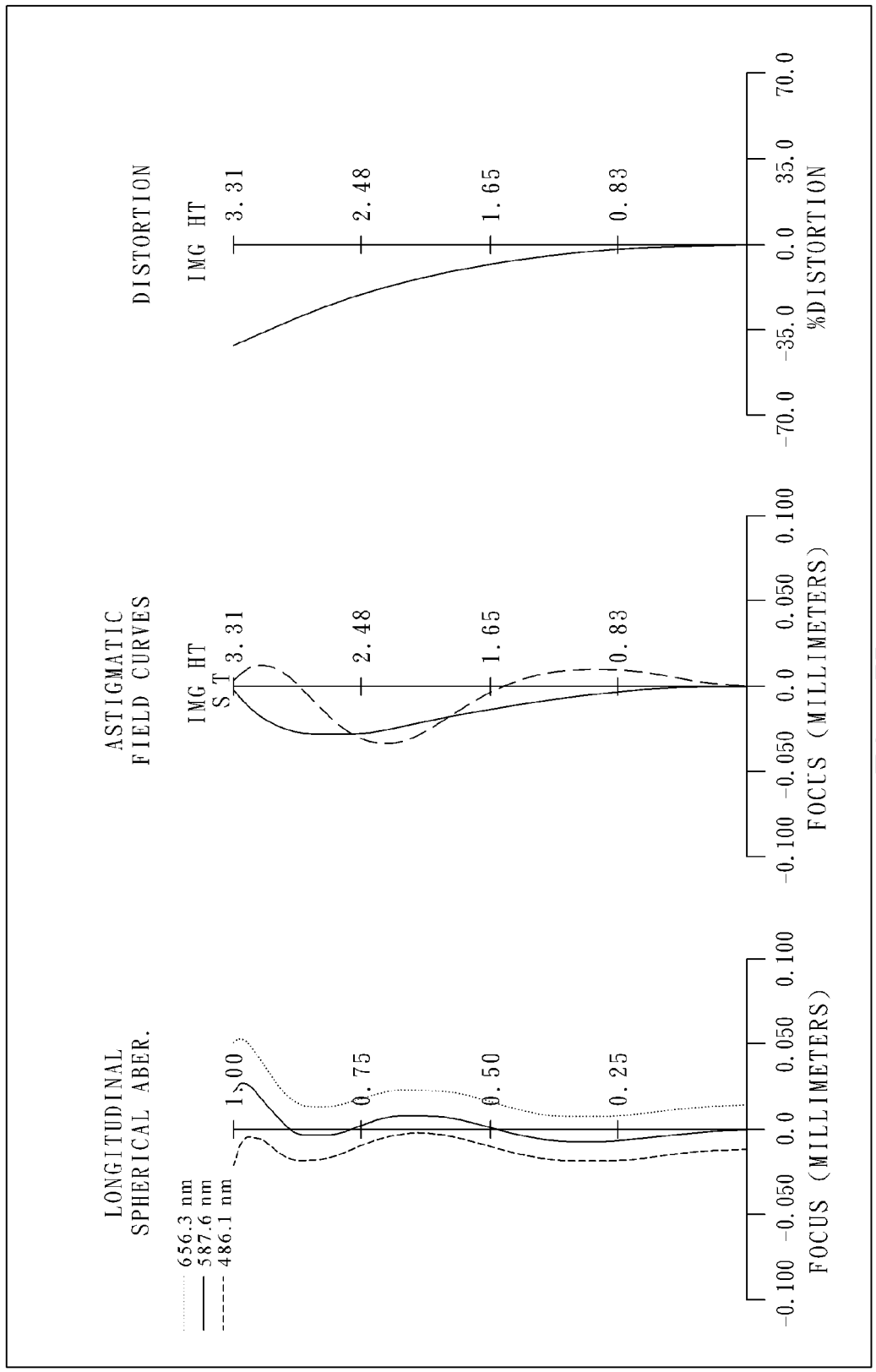
FIG. 5B shows the aberration curves of the fifth embodiment of the present disclosure.

FIG. 5A shows an image lens assembly in accordance with the fifth embodiment of the present disclosure, and FIG. 5B shows the aberration curves of the fifth embodiment of the present disclosure. The image lens assembly of the fifth embodiment of the present disclosure comprises five lens elements, in order from an object side to an image side:

a first lens element 510 made of plastic with negative refractive power having a convex object-side surface 511 and a concave image-side surface 512, the object-side and image-side surfaces 511 and 512 thereof being aspheric;

a second lens element 520 made of plastic with positive refractive power having a concave object-side surface 521 and a convex image-side surface 522, the object-side and image-side surfaces 521 and 522 thereof being aspheric;

a third lens element 530 made of plastic with positive refractive power having a concave object-side surface 531 and a convex image-side surface 532, the object-side and image-side surfaces 531 and 532 thereof being aspheric;

a fourth lens element 540 made of plastic with negative refractive power having a convex object-side surface 541 and a concave image-side surface 542, the object-side and image-side surfaces 541 and 542 thereof being aspheric; and a fifth lens element 550 made of plastic with positive refractive power having a convex object-side surface 551 and a convex image-side surface 552, the object-side and image-side surfaces 551 and 552 thereof being aspheric;

wherein an aperture stop 500 is disposed between the second lens element 520 and the third lens element 530;

the image lens assembly further comprises an IR filter 560 disposed between the image-side surface 552 of the fifth lens element 550 and a cover glass 570, and the IR filter 560 and the cover glass 570 are made of glass and have no influence on the focal length of the image lens assembly; the image lens assembly further comprises an image sensor 580 provided on an image plane 590.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 2.27 mm, Fno = 2.50, HFOV = 68.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 9.123800 (ASP) | 1.300 | Plastic | 1.535 | 56.3 | −3.86 |
| 2 | | 1.600000 (ASP) | 3.382 | | | | |
| 3 | Lens 2 | −41.754800 (ASP) | 1.800 | Plastic | 1.633 | 23.4 | 7.08 |
| 4 | | −4.115400 (ASP) | 0.379 | | | | |
| 5 | Ape. Stop | Plano | 0.173 | | | | |
| 6 | Lens 3 | −13.587000 (ASP) | 1.244 | Plastic | 1.535 | 56.3 | 3.70 |
| 7 | | −1.781130 (ASP) | 0.080 | | | | |
| 8 | Lens 4 | 17.730500 (ASP) | 0.400 | Plastic | 1.650 | 21.4 | −3.60 |
| 9 | | 2.047810 (ASP) | 0.200 | | | | |
| 10 | Lens 5 | 5.242600 (ASP) | 1.096 | Plastic | 1.535 | 56.3 | 5.10 |
| 11 | | −5.261900 (ASP) | 1.500 | | | | |
| 12 | IR-filter | Plano | 0.300 | Glass | 1.516 | 64.1 | — |
| 13 | | Plano | 0.700 | | | | |
| 14 | Cover-glass | Plano | 0.400 | Glass | 1.516 | 64.1 | — |
| 15 | | Plano | 1.286 | | | | |
| 16 | Image | Plano | — | | | | |

* Reference wavelength is d-line 587.6 nm

TABLE 13

Aspheric Coefficients

| | Surface # | | | | |
|---|---|---|---|---|---|
| | 1 | 2 | 3 | 4 | 6 |
| k = | −5.41742E−01 | −7.63361E−01 | 1.01413E+02 | −2.54194E+01 | 0.00000E+00 |
| A4 = | 5.36621E−04 | 1.10464E−02 | −1.33802E−02 | −4.33064E−02 | −9.03057E−03 |
| A6 = | −6.95998E−05 | 1.17812E−03 | −2.51058E−04 | 1.85721E−02 | −3.37789E−02 |
| A8 = | 1.88527E−06 | 3.04088E−04 | −4.45323E−04 | −5.78485E−03 | 3.13210E−02 |
| A10 = | −1.47662E−08 | −2.42901E−07 | 9.34199E−05 | 8.00866E−04 | −2.24938E−02 |

| | Surface # | | | | |
|---|---|---|---|---|---|
| | 7 | 8 | 9 | 10 | 11 |
| k = | 3.37664E−01 | −5.00000E+01 | −3.25544E+00 | 1.34016E+00 | −2.12649E+00 |
| A4 = | 3.96691E−02 | −6.26130E−02 | −3.87142E−02 | 1.45063E−02 | −3.76575E−03 |
| A6 = | −3.78724E−02 | −1.76049E−02 | 8.44700E−03 | −9.82087E−03 | −1.21103E−03 |
| A8 = | 2.06769E−02 | 1.48399E−02 | −6.21278E−04 | 2.57506E−03 | 8.83866E−04 |
| A10 = | −4.19004E−03 | −3.40618E−03 | −1.77892E−04 | −2.52260E−04 | −4.51049E−05 |
| A12 = | | | | −1.48324E−05 | 3.59946E−06 |
| A14 = | | | | 3.61070E−06 | 3.69559E−07 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| f | 2.27 | |R8 − R9|/f | 1.41 |
|---|---|---|---|
| FNO | 2.50 | f/f1 | −0.59 |
| HFOV | 68.0 | |f/f1| + f/f2 | 0.91 |
| T23/CT2 | 0.31 | f/f12 | 0.10 |
| |R6/R5| | 0.13 | FOV | 136.0 |
| |R6/R7| | 0.10 | | |

Embodiment 6

Figure 6A:
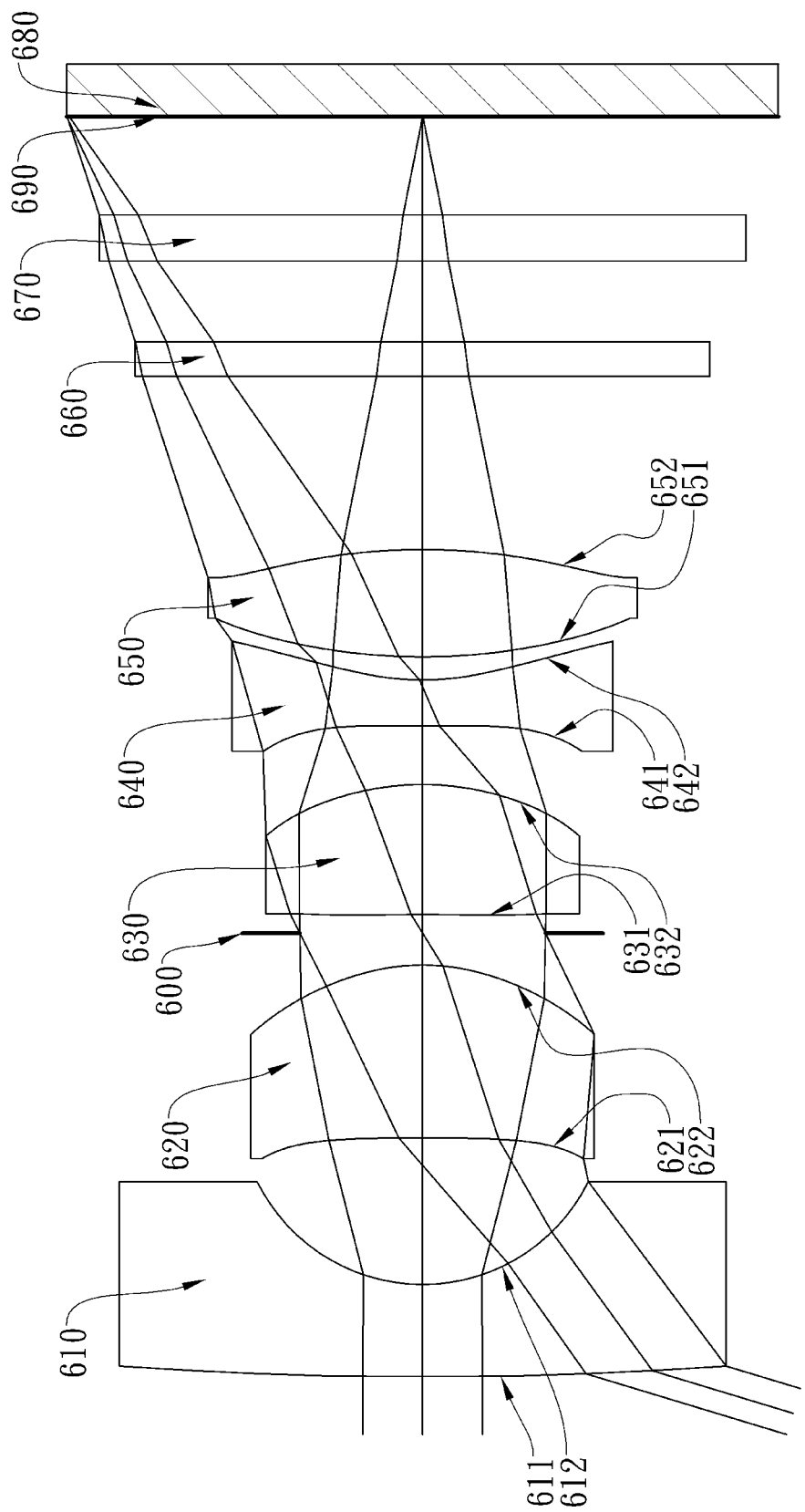
FIG. 6A shows an image lens assembly in accordance with a sixth embodiment of the present disclosure.
Figure 6B:
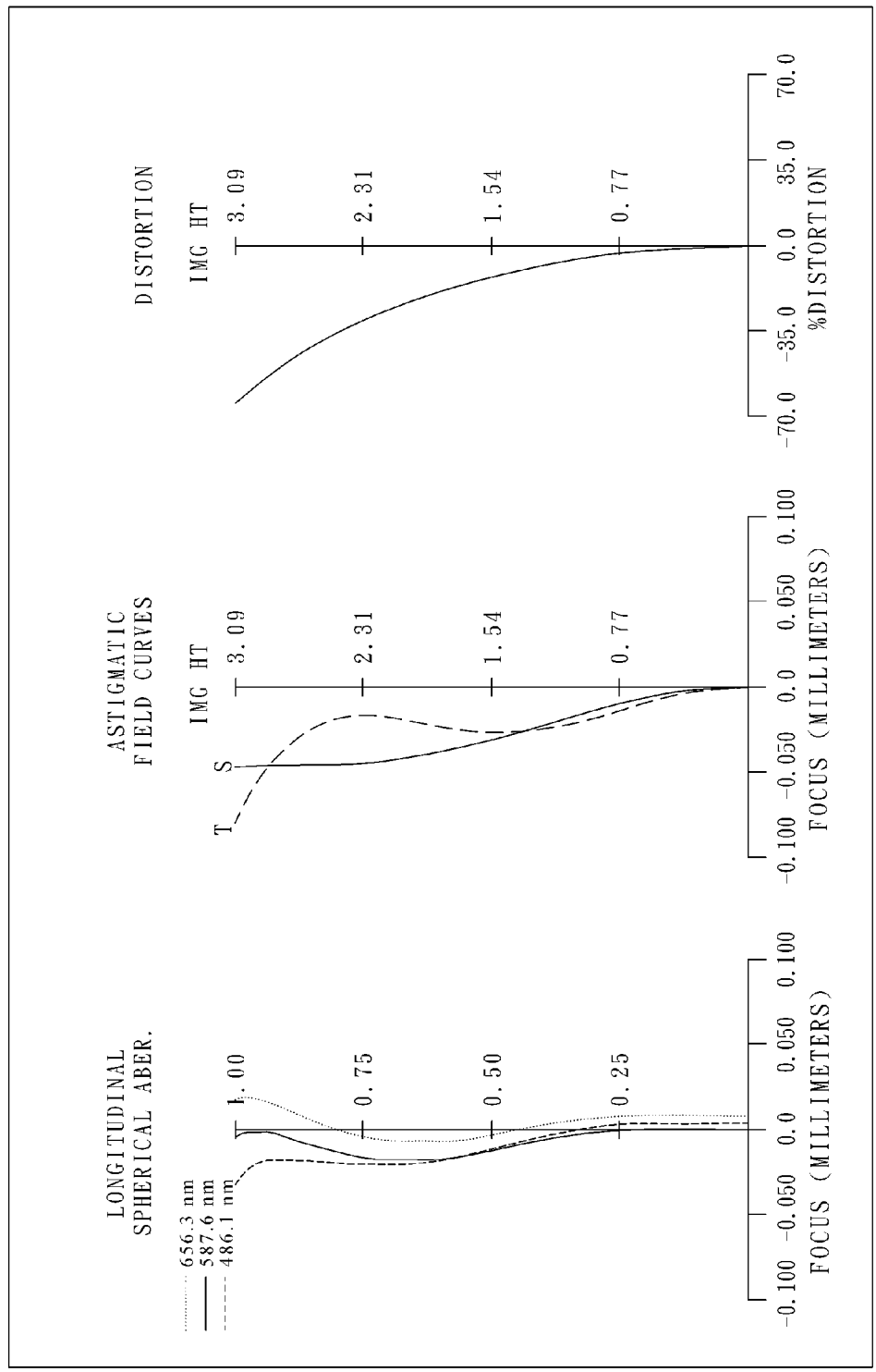
FIG. 6B shows the aberration curves of the sixth embodiment of the present disclosure.

FIG. 6A shows an image lens assembly in accordance with the sixth embodiment of the present disclosure, and FIG. 6B shows the aberration curves of the sixth embodiment of the present disclosure. The image lens assembly of the sixth embodiment of the present disclosure comprises five lens elements, in order from an object side to an image side:

a first lens element 610 made of glass with negative refractive power having a convex object-side surface 611 and a concave image-side surface 612, the object-side and image-side surfaces 611 and 612 thereof being spherical;

a second lens element 620 made of plastic with positive refractive power having a concave object-side surface 621 and a convex image-side surface 622, the object-side and image-side surfaces 621 and 622 thereof being aspheric;

a third lens element 630 made of plastic with positive refractive power having a concave object-side surface 631 and a convex image-side surface 632, the object-side and image-side surfaces 631 and 632 thereof being aspheric;

a fourth lens element 640 made of plastic with negative refractive power having a convex object-side surface 641 and a concave image-side surface 642, the object-side and image-side surfaces 641 and 642 thereof being aspheric; and a fifth lens element 650 made of plastic with positive refractive power having a convex object-side surface 651 and a convex image-side surface 652, the object-side and image-side surfaces 651 and 652 thereof being aspheric;

wherein an aperture stop 600 is disposed between the second lens element 620 and the third lens element 630;

the image lens assembly further comprises an IR filter 660 disposed between the image-side surface 652 of the fifth lens element 650 and a cover glass 670, and the IR filter 660 and the cover glass 670 are made of glass and have no influence on the focal length of the image lens assembly; the image lens assembly further comprises an image sensor 680 provided on an image plane 690.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

the relations of the sixth embodiment are listed in the following TABLE 17.

TABLE 17

(Embodiment 6)

| | | | |
|---|---|---|---|
| f | 2.67 | \|R8 − R9\|/f | 1.11 |
| FNO | 2.57 | f/f1 | −1.15 |
| HFOV | 73.1 | \|f/f1\| + f/f2 | 1.92 |
| T23/CT2 | 0.29 | f/f12 | 0.37 |
| \|R6/R5\| | 0.17 | FOV | 146.2 |
| \|R6/R7\| | 0.08 | | |

Embodiment 7

Figure 7A:
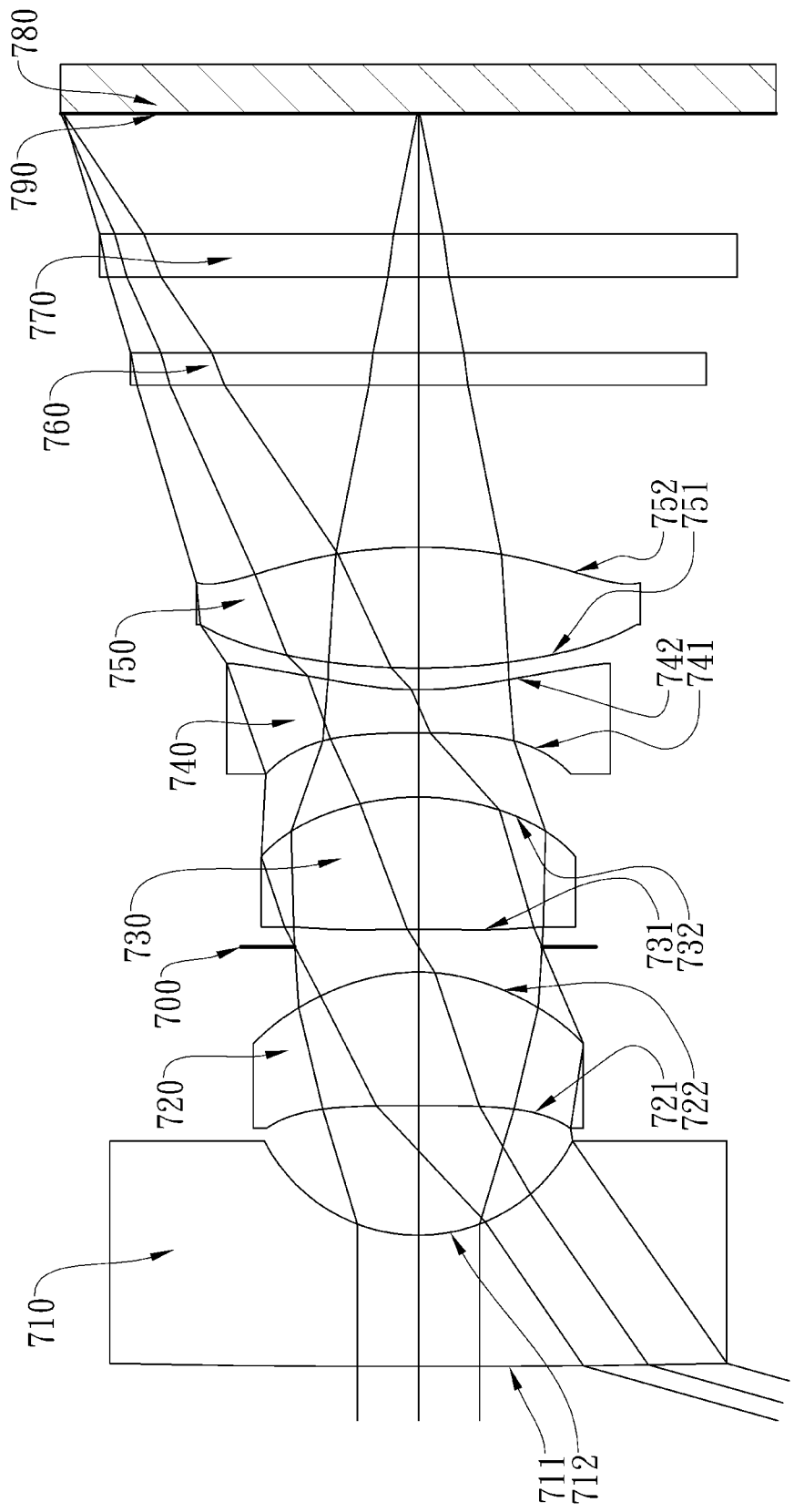
FIG. 7A shows an image lens assembly in accordance with a seventh embodiment of the present disclosure.
Figure 7B:
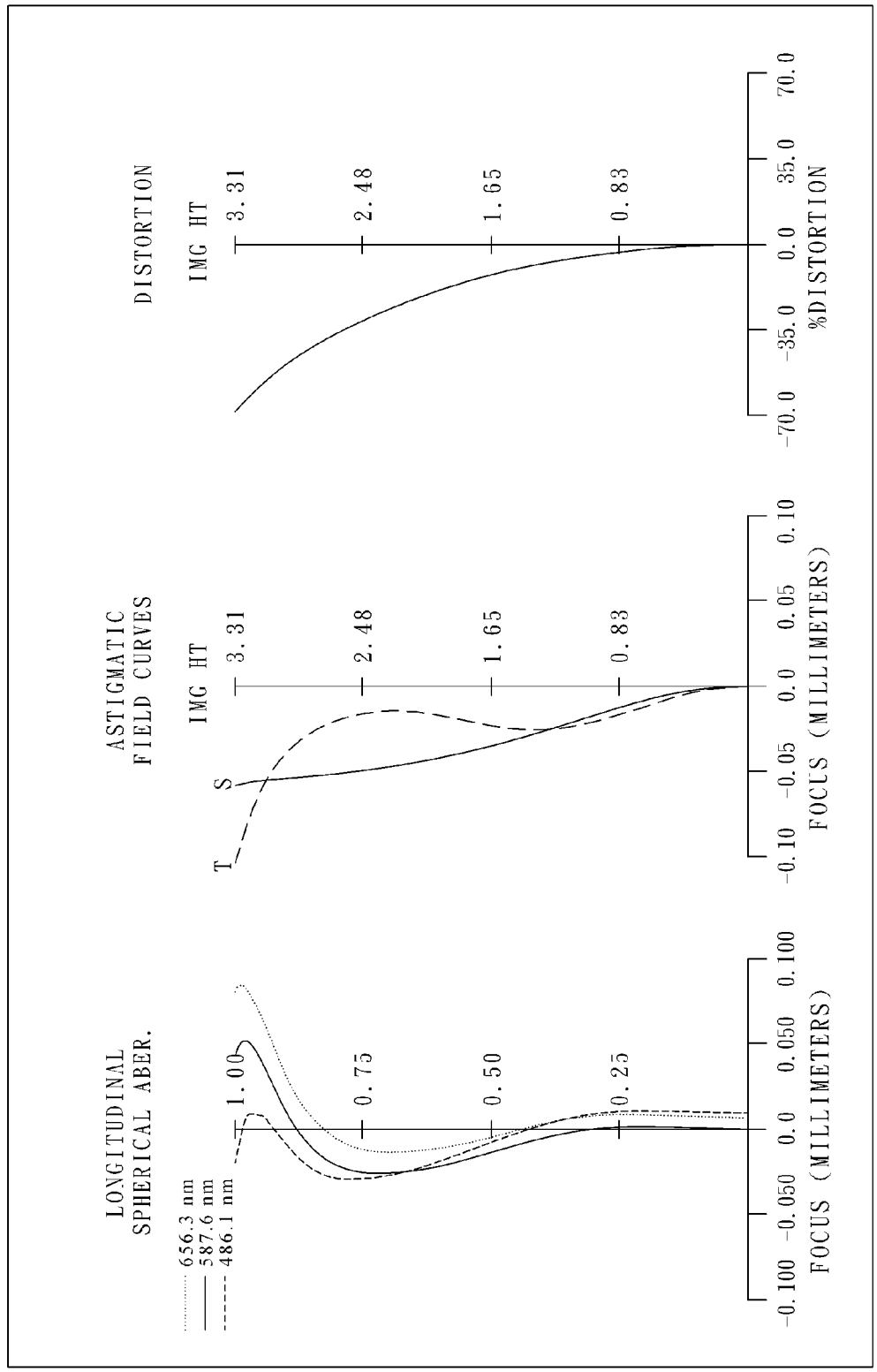
FIG. 7B shows the aberration curves of the seventh embodiment of the present disclosure.

FIG. 7A shows an image lens assembly in accordance with the seventh embodiment of the present disclosure, and FIG. 7B shows the aberration curves of the seventh embodiment of the present disclosure. The image lens assembly of the sev-

TABLE 15

(Embodiment 6)
f = 2.66 mm, Fno = 2.57, HFOV = 73.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 37.704 | 0.800 | Glass | 1.729 | 54.5 | −2.31 |
| 2 | | 1.600 | 1.269 | | | | |
| 3 | Lens 2 | −73.300500 (ASP) | 1.501 | Plastic | 1.530 | 55.8 | 3.45 |
| 4 | | −1.798310 (ASP) | 0.276 | | | | |
| 5 | Ape. Stop | Plano | 0.162 | | | | |
| 6 | Lens 3 | −13.927600 (ASP) | 1.127 | Plastic | 1.535 | 56.3 | 5.08 |
| 7 | | −2.336060 (ASP) | 0.507 | | | | |
| 8 | Lens 4 | 28.490000 (ASP) | 0.400 | Plastic | 1.650 | 21.4 | −3.72 |
| 9 | | 2.215210 (ASP) | 0.200 | | | | |
| 10 | Lens 5 | 5.190200 (ASP) | 0.931 | Plastic | 1.535 | 56.3 | 5.10 |
| 11 | | −5.386600 (ASP) | 1.500 | | | | |
| 12 | IR-filter | Plano | 0.300 | Glass | 1.516 | 64.1 | — |
| 13 | | Plano | 0.700 | | | | |
| 14 | Cover-glass | Plano | 0.400 | Glass | 1.516 | 64.1 | — |
| 15 | | Plano | 0.854 | | | | |
| 16 | Image | Plano | — | | | | |

* Reference wavelength is d-line 587.6 nm

TABLE 16

Aspheric Coefficients

| | Surface # | | | | | | |
|---|---|---|---|---|---|---|---|
| 3 | 4 | 6 | 7 | 8 | 9 | 10 | 11 |
| k = −5.00000E+01 | −4.85391E+00 | 0.00000E+00 | 3.25370E−01 | −5.00000E+01 | −2.92524E+00 | 2.09955E+00 | −2.85600E−02 |
| A4 = −3.21062E−02 | −4.56277E−02 | 7.15948E−02 | 3.16106E−02 | −5.94550E−02 | −4.34931E−02 | −7.14931E−04 | −8.41682E−04 |
| A6 = −6.36860E−03 | 1.13784E−02 | −4.38612E−02 | −2.64834E−02 | −1.79059E−02 | 7.10835E−03 | −3.46431E−03 | 1.59174E−04 |
| A8 = 3.03804E−03 | −4.21708E−03 | 1.70170E−02 | 1.05324E−02 | 1.15656E−02 | 1.92538E−03 | 1.77658E−03 | 4.15963E−04 |
| A10 = −1.51127E−03 | 4.80741E−04 | −5.55681E−03 | −2.68225E−03 | −2.53141E−03 | −6.47195E−04 | −2.22442E−04 | 4.29803E−05 |
| A12 = | | | | −1.13290E−19 | | −1.48324E−05 | 3.59946E−06 |
| A14 = | | | | | | 3.61070E−06 | 3.69559E−07 |

The equation of the aspheric surface profiles of the sixth embodiment has the same form as that of the first embodiment. Moreover, the description of the factors in the relations is as those set forth in the first embodiment, but the values of enth embodiment of the present disclosure comprises five lens elements, in order from an object side to an image side:

a first lens element 710 made of glass with negative refractive power having a convex object-side surface 711 and a concave image-side surface 712, the object-side and image-side surfaces 711 and 712 thereof being spherical;

a second lens element 720 made of plastic with positive refractive power having a concave object-side surface 721 and a convex image-side surface 722, the object-side and image-side surfaces 721 and 722 thereof being aspheric;

a third lens element 730 made of plastic with positive refractive power having a concave object-side surface 731 and a convex image-side surface 732, the object-side and image-side surfaces 731 and 732 thereof being aspheric;

a fourth lens element 740 made of plastic with negative refractive power having a concave object-side surface 741 and a concave image-side surface 742, the object-side and image-side surfaces 741 and 742 thereof being aspheric; and a fifth lens element 750 made of plastic with positive refractive power having a convex object-side surface 751 and a convex image-side surface 752, the object-side and image-side surfaces 751 and 752 thereof being aspheric;

wherein an aperture stop 700 is disposed between the second lens element 720 and the third lens element 730;

the image lens assembly further comprises an IR filter 760 disposed between the image-side surface 752 of the fifth lens element 750 and a cover glass 770, and the IR filter 760 and the cover glass 770 are made of glass and have no influence on the focal length of the image lens assembly; the image lens assembly further comprises an image sensor 780 provided on an image plane 790.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 2.91 mm, Fno = 2.57, HFOV = 74.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 135.113 | 1.216 | Glass | 1.729 | 54.5 | −2.23 |
| 2 | | 1.600 | 1.199 | | | | |
| 3 | Lens 2 | −94.903700 (ASP) | 1.239 | Plastic | 1.530 | 55.8 | 3.37 |
| 4 | | −1.759520 (ASP) | 0.234 | | | | |
| 5 | Ape. Stop | Plano | 0.162 | | | | |
| 6 | Lens 3 | −13.927600 (ASP) | 1.224 | Plastic | 1.535 | 56.3 | 5.06 |
| 7 | | −2.335610 (ASP) | 0.594 | | | | |
| 8 | Lens 4 | −12.708200 (ASP) | 0.400 | Plastic | 1.650 | 21.4 | −3.69 |
| 9 | | 2.993610 (ASP) | 0.200 | | | | |
| 10 | Lens 5 | 6.260100 (ASP) | 1.120 | Plastic | 1.535 | 56.3 | 5.11 |
| 11 | | −4.543900 (ASP) | 1.500 | | | | |
| 12 | IR-filter | Plano | 0.300 | Glass | 1.516 | 64.1 | — |
| 13 | | Plano | 0.700 | | | | |
| 14 | Cover-glass | Plano | 0.400 | Glass | 1.516 | 64.1 | — |
| 15 | | Plano | 1.116 | | | | |
| 16 | Image | Plano | — | | | | |

* Reference wavelength is d-line 587.6 nm

TABLE 19

Aspheric Coefficients

| | | | | Surface # | | | | |
|---|---|---|---|---|---|---|---|---|
| | 3 | 4 | 6 | 7 | 8 | 9 | 10 | 11 |
| k = | 5.00000E+01 | −4.70007E+00 | 0.00000E+00 | 3.91417E−01 | 5.00000E+01 | −2.83017E+00 | 3.11997E+00 | 1.78360E−02 |
| A4 = | −3.80073E−02 | −4.59672E−02 | 8.01730E−02 | 2.41736E−02 | −5.78987E−02 | −4.37996E−02 | 2.88146E−04 | −9.20232E−04 |
| A6 = | −7.18025E−03 | 9.21970E−03 | −4.59413E−02 | −2.13996E−02 | −1.72218E−02 | 6.87998E−03 | −3.24241E−03 | 2.44553E−04 |
| A8 = | 3.53047E−03 | −3.11625E−03 | 2.02598E−02 | 1.02798E−02 | 1.13347E−02 | 1.87853E−03 | 1.77405E−03 | 2.74264E−04 |
| A10 = | −1.57561E−03 | 1.67609E−04 | −6.92588E−03 | −2.91039E−03 | −3.07428E−03 | −5.89789E−04 | −2.13937E−04 | 3.37998E−05 |
| A12 = | | | | | 3.01798E−19 | | −1.48324E−05 | 3.59946E−06 |
| A14 = | | | | | | | 3.61070E−06 | 3.69559E−07 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| f | 2.91 | |R8 − R9|/f | 1.12 |
|---|---|---|---|
| FNO | 2.57 | f/f1 | −1.31 |
| HFOV | 74.2 | |f/f1| + f/f2 | 2.17 |
| T23/CT2 | 0.32 | f/f12 | 0.34 |
| |R6/R5| | 0.17 | FOV | 148.4 |
| |R6/R7| | 0.18 | | |

Embodiment 8

Figure 8A:
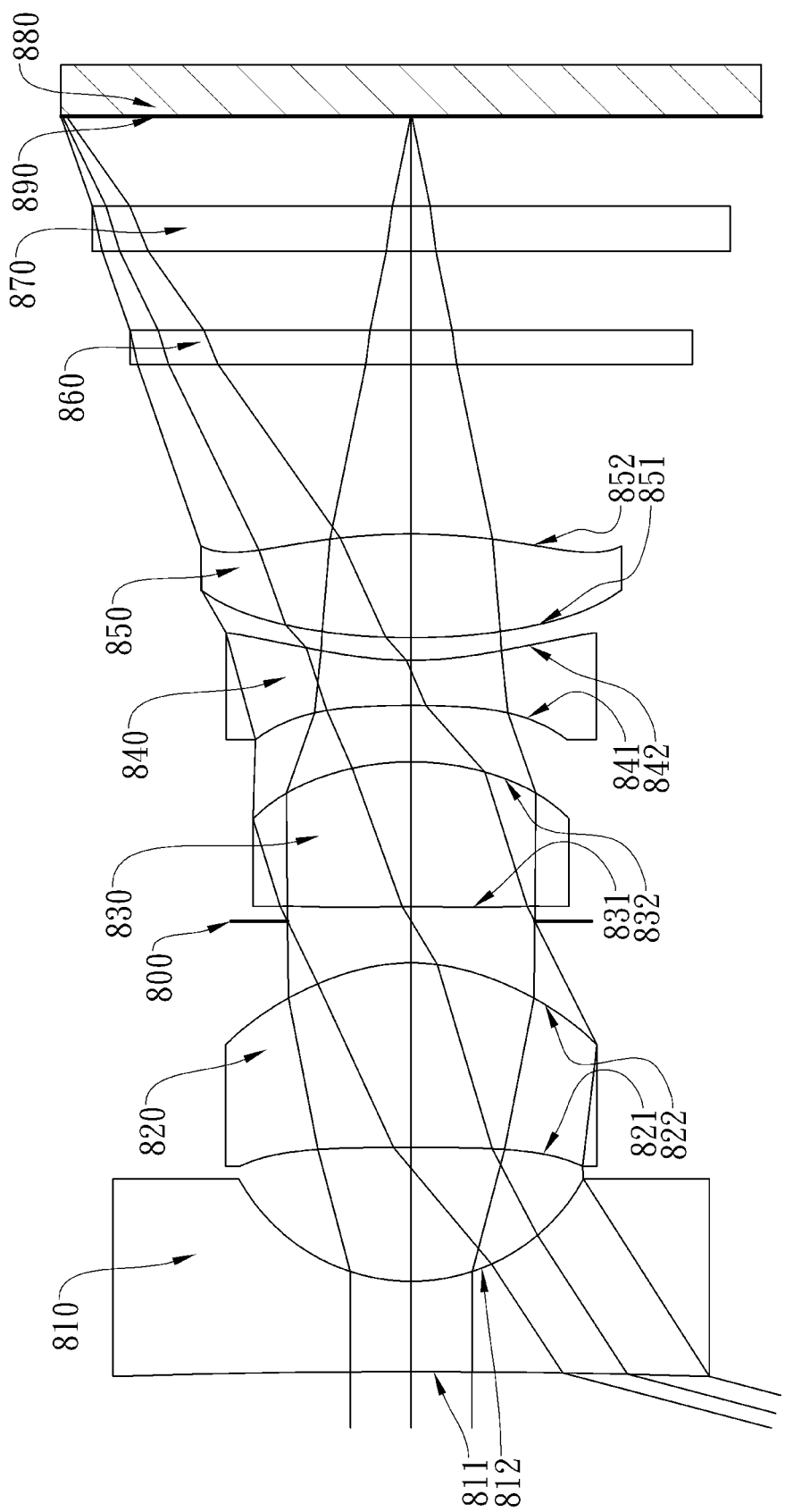
FIG. 8A shows an image lens assembly in accordance with an eighth embodiment of the present disclosure.
Figure 8B:
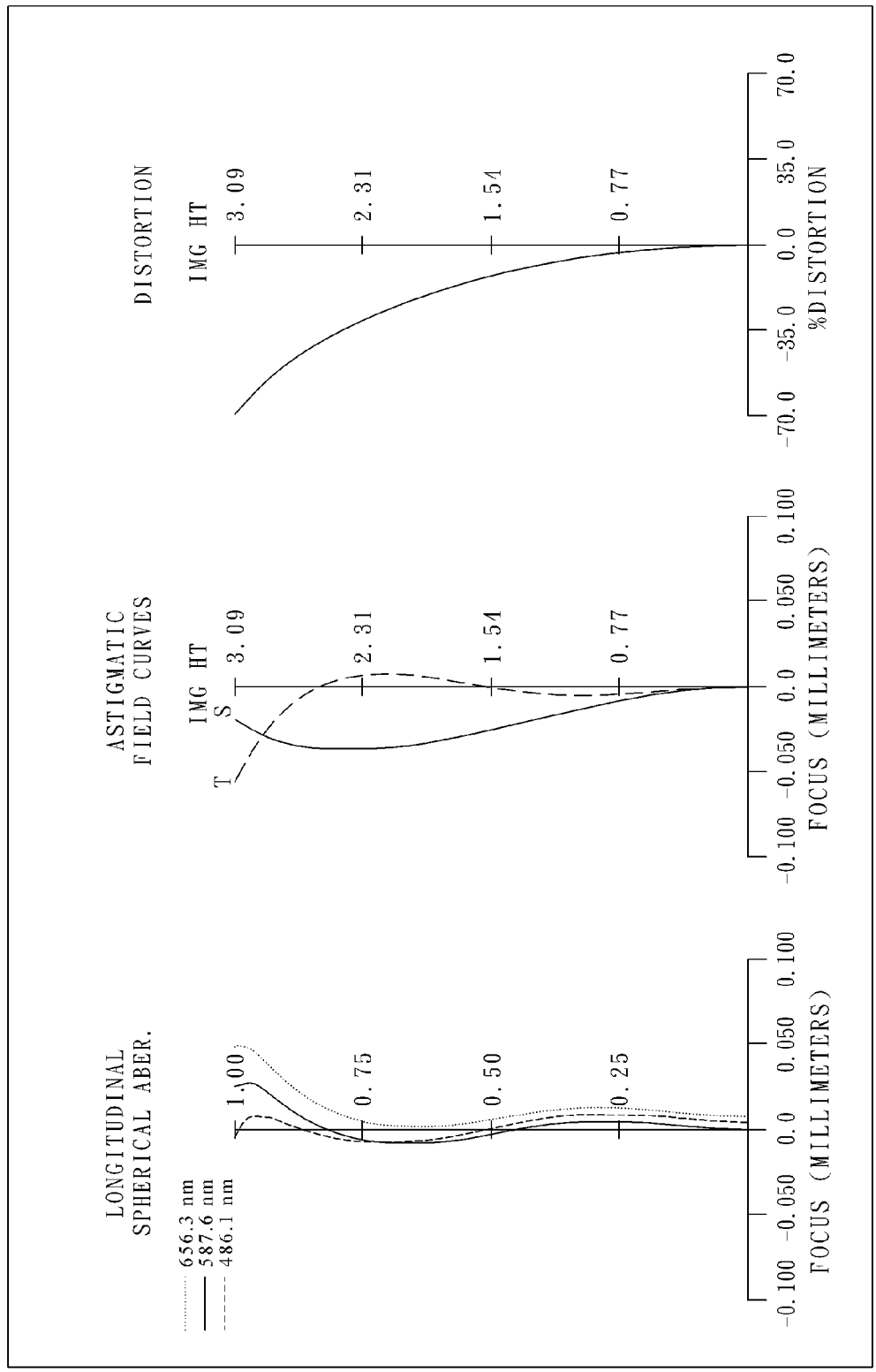
FIG. 8B shows the aberration curves of the eighth embodiment of the present disclosure.

FIG. 8A shows an image lens assembly in accordance with the eighth embodiment of the present disclosure, and FIG. 8B shows the aberration curves of the eighth embodiment of the present disclosure. The image lens assembly of the eighth embodiment of the present disclosure comprises five lens elements, in order from an object side to an image side:

a first lens element 810 made of glass with negative refractive power having a concave object-side surface 811 and a concave image-side surface 812, the object-side and image-side surfaces 811 and 812 thereof being spherical;

a second lens element 820 made of plastic with positive refractive power having a concave object-side surface 821 and a convex image-side surface 822, the object-side and image-side surfaces 821 and 822 thereof being aspheric;

a third lens element 830 made of plastic with positive refractive power having a concave object-side surface 831 and a convex image-side surface 832, the object-side and image-side surfaces 831 and 832 thereof being aspheric;

a fourth lens element 840 made of plastic with negative refractive power having a concave object-side surface 841 and a concave image-side surface 842, the object-side and image-side surfaces 841 and 842 thereof being aspheric; and a fifth lens element 850 made of plastic with positive refractive power having a convex object-side surface 851 and a convex image-side surface 852, the object-side and image-side surfaces 851 and 852 thereof being aspheric;

wherein an aperture stop 800 is disposed between the second lens element 820 and the third lens element 830;

the image lens assembly further comprises an IR filter 860 disposed between the image-side surface 852 of the fifth lens element 850 and a cover glass 870, and the IR filter 860 and the cover glass 870 are made of glass and have no influence on the focal length of the image lens assembly; the image lens assembly further comprises an image sensor 880 provided on an image plane 890.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
f = 2.68 mm, Fno = 2.49, HFOV = 75.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −83.333 | 0.800 | Glass | 1.729 | 54.5 | −2.32 |
| 2 | | 1.737 | 1.182 | | | | |
| 3 | Lens 2 | −94.903700 (ASP) | 1.635 | Plastic | 1.530 | 55.8 | 3.29 |
| 4 | | −1.721180 (ASP) | 0.368 | | | | |
| 5 | Ape. Stop | Plano | 0.128 | | | | |
| 6 | Lens 3 | −13.927600 (ASP) | 1.283 | Plastic | 1.535 | 56.3 | 5.11 |
| 7 | | −2.357440 (ASP) | 0.498 | | | | |
| 8 | Lens 4 | −11.296200 (ASP) | 0.400 | Plastic | 1.650 | 21.4 | −3.69 |
| 9 | | 3.082200 (ASP) | 0.200 | | | | |
| 10 | Lens 5 | 5.732700 (ASP) | 0.919 | Plastic | 1.535 | 56.3 | 5.39 |
| 11 | | −5.460500 (ASP) | 1.500 | | | | |
| 12 | IR-filter | Plano | 0.300 | Glass | 1.516 | 64.1 | — |
| 13 | | Plano | 0.700 | | | | |
| 14 | Cover-glass | Plano | 0.400 | Glass | 1.516 | 64.1 | — |
| 15 | | Plano | 0.795 | | | | |
| 16 | Image | Plano | — | | | | |

* Reference wavelength is d-line 587.6 nm

TABLE 22

Aspheric Coefficients

| | Surface # | | | | | | |
|---|---|---|---|---|---|---|---|
| 3 | 4 | 6 | 7 | 8 | 9 | 10 | 11 |
| k = −5.00000E+01 | −4.56284E+00 | 0.00000E+00 | 5.69251E−01 | 1.75787E+01 | −2.16361E+00 | 4.18583E+00 | −2.32058E+00 |
| A4 = −2.39949E−02 | −4.05478E−02 | 7.57198E−02 | 2.23604E−02 | −5.35571E−02 | −4.12140E−02 | 1.51703E−03 | 1.77289E−03 |
| A6 = −4.58660E−03 | 1.11340E−02 | −4.94931E−02 | −2.23829E−02 | −1.44601E−02 | 7.78193E−03 | −2.72980E−03 | 9.87891E−04 |
| A8 = 3.16332E−03 | −3.28482E−03 | 2.04778E−02 | 9.91425E−03 | 1.24154E−02 | 1.79497E−03 | 1.90079E−03 | 5.70747E−04 |
| A10 = −9.30923E−04 | 2.62023E−04 | −6.98848E−03 | −2.47581E−03 | −3.25333E−03 | −7.66808E−04 | −2.25153E−04 | 9.51766E−05 |
| A12 = | | | | 3.73419E−19 | | −1.48324E−05 | 3.59946E−06 |
| A14 = | | | | | | 3.61070E−06 | 3.69559E−07 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f | 2.68 | $|R8 - R9|/f$ | 0.91 |
|---|---|---|---|
| FNO | 2.49 | f/f1 | −1.15 |
| HFOV | 75.2 | $|f/f1| + f/f2$ | 1.97 |
| T23/CT2 | 0.30 | f/f12 | 0.46 |
| $|R6/R5|$ | 0.17 | FOV | 150.4 |
| $|R6/R7|$ | 0.21 | | |

It is to be noted that TABLES 1-23 show different data of the different embodiments, however, the data of the different embodiments are obtained from experiments. Therefore, any image lens assembly of the same structure is considered to be within the scope of the present disclosure even if it uses different data. The embodiments depicted above and the appended drawings are exemplary and are not intended to limit the scope of the present disclosure.

What is claimed is:

1. An image lens assembly comprising five lens elements with refractive power, in order from an object side to an image side:
    a first lens element with negative refractive power having a concave image-side surface;
    a second lens element with positive refractive power having a convex image-side surface;
    a third lens element with positive refractive power having a concave object-side surface and a convex image-side surface;
    a fourth lens element with negative refractive power; and
    a fifth lens element with positive refractive power;
    wherein a radius of the curvature of the image-side surface of the third lens element is R6, a radius of the curvature of the object-side surface of the fourth lens element is R7, an axial distance between the second lens element and the third lens element is T23, a central thickness of the second lens element is CT2, a focal length of the image lens assembly is f, a focal length of the first lens element is f1, a focal length of the second lens element is f2, and they satisfy the following relations:

$|R6/R7|<0.85$;

$0<T23/CT2<1.0$; and $0.7<|f/f1|+f/f2<2.4$.

2. The image lens assembly according to claim 1, wherein the fourth lens element has a concave image-side surface, and the fifth lens element has a convex object-side surface and a convex image-side surface.

3. The image lens assembly according to claim 2, wherein the second lens element has a concave object-side surface.

4. The image lens assembly according to claim 3, wherein the axial distance between the second lens element and the third lens element is T23, the central thickness of the second lens element is CT2, and they satisfy the following relation:

$0<T23/CT2<0.6$.

5. The image lens assembly according to claim 3, wherein the focal length of the image lens assembly is f, the focal length of the first lens element is f1, the focal length of the second lens element is f2, and they satisfy the following relation:

$0.85<|f/f1|+f/f2<2.2$.

6. The image lens assembly according to claim 3, wherein the radius of the curvature of the image-side surface of the third lens element is R6, the radius of the curvature of the object-side surface of the fourth lens element is R7, and they satisfy the following relation:

$|R6/R7|<0.7$.

7. The image lens assembly according to claim 3, wherein the focal length of the image lens assembly is f, the focal length of the first lens element is f1, and they satisfy the following relation:

$-1.6<f/f1<-0.58$.

8. The image lens assembly according to claim 3, wherein a maximal field of view of the image lens assembly is FOV, and it satisfies the following relation:

120 deg<FOV<180 deg.

9. The image lens assembly according to claim 3, wherein the focal length of the image lens assembly is f, a composite focal length of the first and second lens elements is f12, and they satisfy the following relation:

$0<f/f12<0.5$.

10. The image lens assembly according to claim 9, wherein at least one of the object-side and image-side surfaces of the second, third, fourth and fifth lens elements is aspheric, and each of the second, third, fourth and fifth lens elements is made of plastic material.

11. The image lens assembly according to claim 1, wherein the fourth lens element has a convex object-side surface and a concave image-side surface.

12. An image lens assembly comprising, in order from an object side to an image side:
    a front lens group having positive refractive power comprising two lens elements with refractive power, in order from the object side to the image side:
        a first lens element with negative refractive power having a concave image-side surface; and
        a second lens element with positive refractive power having a convex image-side surface;
    a stop;
    a rear lens group having positive refractive power comprising, in order from the object side to the image side:
        a third lens element with positive refractive power having a concave object-side surface and a convex image-side surface;
        a fourth lens element with negative refractive power; and
        a fifth lens element with positive refractive power,
    wherein a radius of the curvature of the image-side surface of the third lens element is R6, a radius of the curvature of the object-side surface of the fourth lens element is R7, an axial distance between the second lens element and the third lens element is T23, a central thickness of the second lens element is CT2, a focal length of the image lens assembly is f, a focal length of the first lens element is f1, a focal length of the second lens element is f2, and they satisfy the following relations:

$|R6/R7|<0.85$;

$0<T23/CT2<1.0$; and $0.7<|f/f1|+f/f2<2.4$.

13. The image lens assembly according to claim 12, wherein the focal length of the image lens assembly is f, the focal length of the first lens element is f1, the focal length of the second lens element is f2, and they satisfy the following relation:

$0.85<|f/f1|+f/f2<2.2$.

14. The image lens assembly according to claim 12, wherein the fourth lens element has a convex object-side surface and a concave image-side surface.

15. The image lens assembly according to claim 12, wherein a radius of the curvature of the image-side surface of the fourth lens element is R8, a radius of the curvature of the object-side surface of the fifth lens element is R9, the focal length of the image lens assembly is f, and they satisfy the following relation:

$0.12<|R8-R9|/f<2.5.$

16. The image lens assembly according to claim 15, wherein the axial distance between the second lens element and the third lens element is T23, the central thickness of the second lens element is CT2, and they satisfy the following relation:

$0<T23/CT2<0.6.$

17. The image lens assembly according to claim 15, wherein the radius of the curvature of the image-side surface of the third lens element is R6, the radius of the curvature of the object-side surface of the fourth lens element is R7, and they satisfy the following relation:

$|R6/R7|<0.7.$

18. The image lens assembly according to claim 15, wherein the second lens element has a concave object-side surface.

19. The image lens assembly according to claim 18, wherein at least one of the object-side and image-side surfaces of the second, third, fourth and fifth lens elements is aspheric, and each of the second, third, fourth and fifth lens elements is made of plastic material.

20. An image lens assembly comprising five lens elements with refractive power, in order from an object side to an image side:
- a first lens element with negative refractive power having a concave image-side surface;
- a second lens element with positive refractive power having a concave object-side surface and a convex image-side surface;
- a third lens element with positive refractive power having a convex image-side surface;
- a fourth lens element with negative refractive power, at least one of the object-side and the image-side surfaces thereof being aspheric, and the fourth lens element is made of plastic; and
- a fifth lens element with positive refractive power, at least one of the object-side and the image-side surfaces thereof being aspheric, and the fifth lens element is made of plastic;

wherein a radius of the curvature of the image-side surface of the third lens element is R6, a radius of the curvature of the object-side surface of the third lens element is R5, a radius of the curvature of the object-side surface of the fourth lens element is R7, an axial distance between the second lens element and the third lens element is T23, a central thickness of the second lens element is CT2, a focal length of the image lens assembly is f, a focal length of the first lens element is f1, a focal length of the second lens element is f2, and they satisfy the following relations:

$|R6/R5|<0.6;$ $|R6/R7|<0.85;$ $0<T23/CT2<1.0;$ and $0.7<|f/f1|+f/f2<2.4.$

21. The image lens assembly according to claim 20, wherein the focal length of the image lens assembly is f, the focal length of the first lens element is f1, the focal length of the second lens element is f2, and they satisfy the following relation:

$0.85<|f/f1|+f/f2<2.2.$

22. The image lens assembly according to claim 20, wherein a radius of the curvature of the image-side surface of the fourth lens element is R8, a radius of the curvature of the object-side surface of the fifth lens element is R9, the focal length of the image lens assembly is f, and they satisfy the following relation:

$0.12<|R8-R9|/f<2.5.$

23. The image lens assembly according to claim 22, wherein the focal length of the image lens assembly is f, a composite focal length of the first and second lens elements is f12, and they satisfy the following relation:

$0<f/f12<0.5.$

24. The image lens assembly according to claim 22, wherein the third lens element has a concave object-side surface.

25. The image lens assembly according to claim 21, wherein the fourth lens element has a convex object-side surface and a concave image-side surface.

* * * * *